Dec. 20, 1955     O. L. PATTERSON     2,727,682
ANALOG COMPUTER OR ANALYZER
Filed Nov. 30, 1949                  8 Sheets-Sheet 1

INVENTOR.
OMAR L. PATTERSON
BY
ATTORNEYS.

Dec. 20, 1955     O. L. PATTERSON     2,727,682
ANALOG COMPUTER OR ANALYZER

Filed Nov. 30, 1949     8 Sheets-Sheet 3

INVENTOR.
OMAR L. PATTERSON
BY
*Busser + Harding*
ATTORNEYS

INVENTOR.
OMAR L. PATTERSON

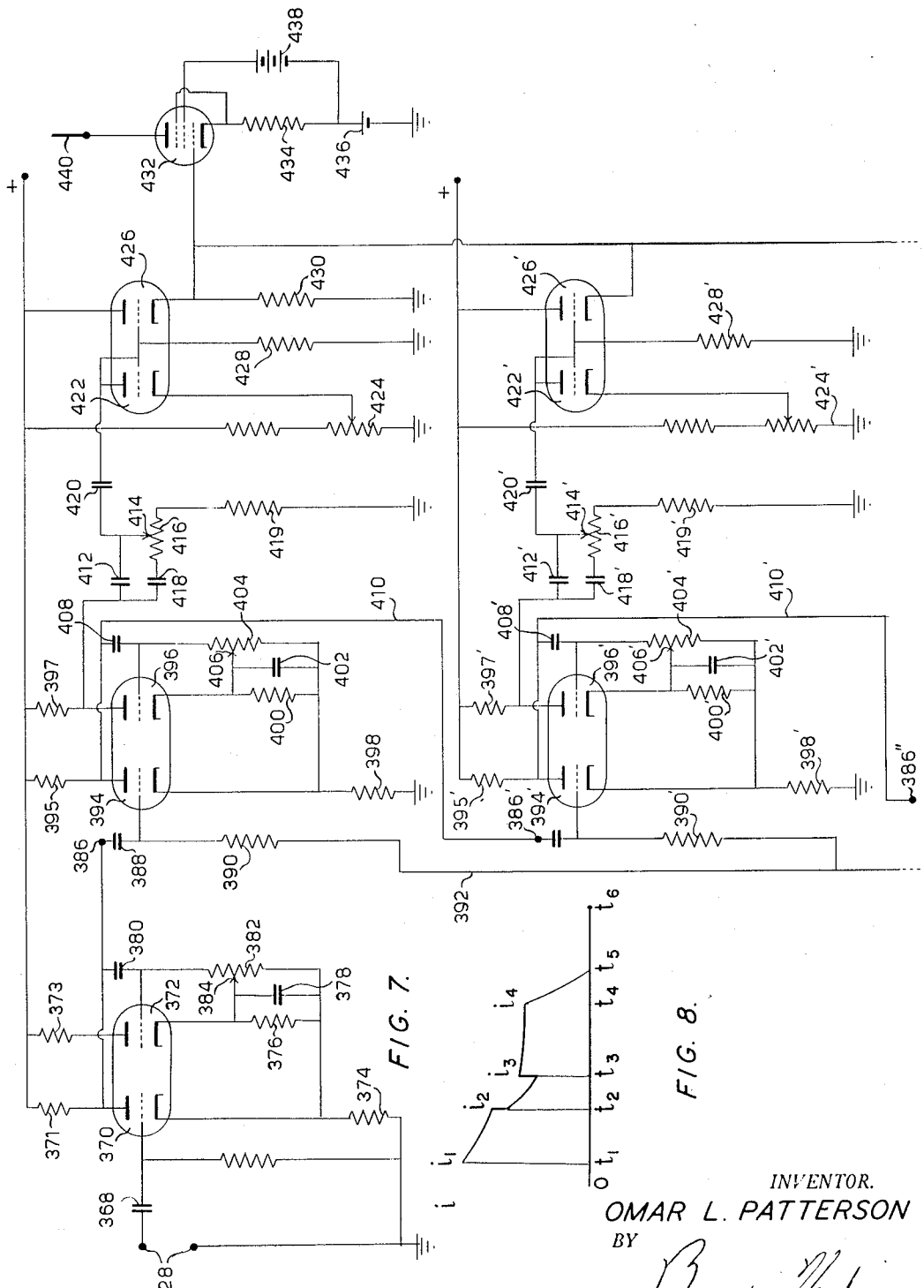

Dec. 20, 1955     O. L. PATTERSON     2,727,682
ANALOG COMPUTER OR ANALYZER
Filed Nov. 30, 1949     8 Sheets-Sheet 7

INVENTOR.
OMAR L. PATTERSON
BY
ATTORNEYS.

Dec. 20, 1955  O. L. PATTERSON  2,727,682
ANALOG COMPUTER OR ANALYZER
Filed Nov. 30, 1949  8 Sheets-Sheet 8
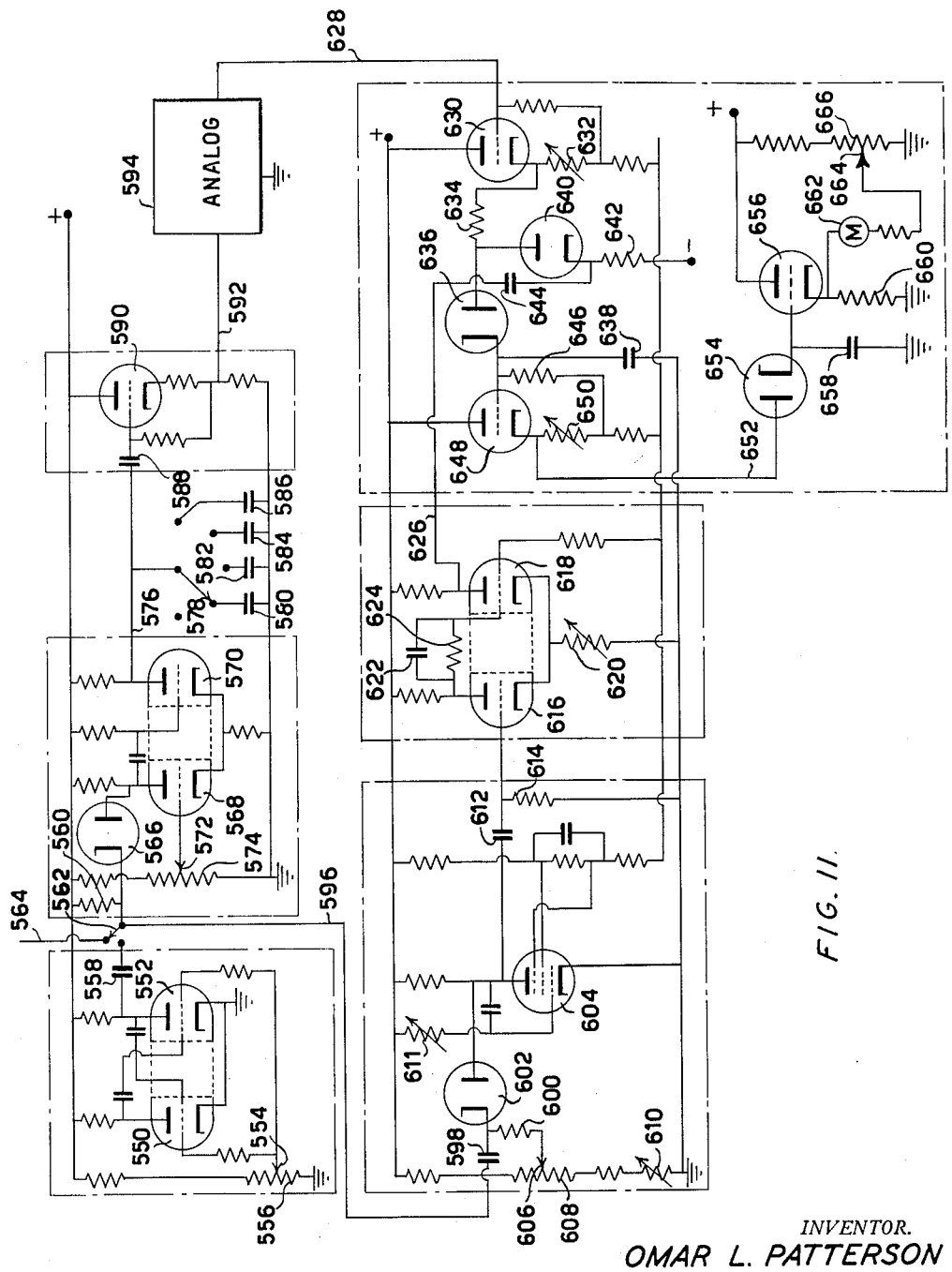
FIG. II.
INVENTOR.
OMAR L. PATTERSON
BY
ATTORNEYS.

United States Patent Office 2,727,682
Patented Dec. 20, 1955

2,727,682

ANALOG COMPUTER OR ANALYZER

Omar L. Patterson, Media, Pa., assignor to Sun Oil Company, Philadelphia, Pa., a corporation of New Jersey Application November 30, 1949, Serial No. 130,270

30 Claims. (Cl. 235—61)

This invention relates to analog computers or analyzers and more particularly to such type of apparatus involving low time constants, and adapted for the solution of problems involving transients.

It is well known that various problems may be solved by the operation of analogs in the form of electrical, electromechanical, electroacoustic, or other networks or systems in which fixed or variable parameters, potentials, currents, displacements, etc., are identifiable with various parameters and variables of a system the characteristics of operation of which are to be determined. Since usually it is desirable to ascertain the nature of transient phenomena and, hence, observations must be made at particular instants of time, the analog computers heretofore constructed have generally had long time constants in order that changes would be sufficiently slowed down to make possible readings of currents or potentials at particular instants to a fair degree of accuracy. Under these conditions very large capacities are usually necessary and resistances must also be high, giving rise to difficulties in the matter of avoidance of leakage of current which would vitiate the results. In view of the large values of both capacity and resistance involved, it becomes practically impossible to utilize distributed parameters and, consequently, it has been necessary to use lumped parameters even though, theoretically, distributed parameters would have to be used to secure results of high accuracy.

The various difficulties of analog computers having long time constants have been well recognized in the art and attempts have been made to avoid the great bulk and cost, difficulties of operation, and limitations on the fidelity of reproduction of the system undergoing study, by providing analog systems having low time constants, observations then being made through the use of oscilloscopes. However, such systems also have grave deficiencies and, in fact, to such extent that the computers having long time constants have generally been preferred in that oscilloscopes are not generally readable to any high degree of accuracy either as to points on the time scale or ordinates which may represent currents or potentials.

In accordance with the present invention there is provided an analog computer which, in operation, is repeatedly cycled at a high frequency rate so that the time constants of the computer may be quite small. As will be described in detail hereafter a cycle repetition at the rate of 250 times per second is typical though, as will be evident, the frequency may be much less or much greater consistent with the attainment of proper results in connection with particular problems. In order to render useful operation involving such cyclic repetition provisions are made for the precision marking of instants of time during the repetition cycles. For example, as will be hereinafter described, a time may be marked or established at a particular instant following the initiation of each cycle to a degree of accuracy within 1 microsecond in a total range of 3000 microseconds. By providing a pulse marking such an instant of time repeatedly in successive cycles, it will be evident that there may be gated the value of a particular variable such as a potential at that particular instant so that, in a sense, a "stroboscopic" view of a recurrent phenomenon may be secured, picked off at a particular repeated phase instant of the time cycle. In accordance with the invention the measurement of a variable at a particular instant in each of a series of repeated cycles is made to a high degree of accuracy, the result thus being, in effect, what could theoretically be secured by making measurements of abscissae and ordinates on an oscilloscope screen if the oscilloscope was of a type permitting a very high degree of accuracy of measurement beyond that attainable in any now known.

As will become clear hereafter, it is desired to program the variations of certain variables (currents) in an arbitrary fashion during each repetition cycle of operation. Provision is made to accomplish this with the result that the operator can establish a precise functional variation with time of one or more variables in the system.

In accordance with the invention the complete cycle is broken up into two parts, one of which prepares the apparatus for its analog operation and the other of which involves the transient phase of operation which is of interest.

The broad objects of the invention have to do with the attainment of the results and operations which have been described. Still further objects of the invention relate to the provision of various parts of the apparatus which, though highly advantageous in combination with each other, as will be evident to those skilled in the art, may be used separately as for example in the case of the time selecting devices for the accurate establishment of time instants in repeated cycles, the gating systems, accurate measuring devices, etc.

In particular the computer has been designed for the solution of problems relating to oil reservoirs, and the description given hereafter will be primarily specifically directed to an oil reservoir analyzer which may be regarded as typical of various other computers which might be provided in accordance with the invention. At the same time, the oil reservoir analyzer presents particular problems related to its special function and further objects of the invention have reference to the provision of an oil reservoir analyzer having substantial advantages over any heretofore provided. Instead of providing in such an analyzer for long time constants necessitating the abandonment of any idea of using distributed capacities and involving extreme difficulties of maintaining sufficiently high resistances, both from the standpoint of providing a distributed resistance system and of avoiding leakages in various parts of the apparatus, the present invention by reason of low time constants, tied with a high repetition rate, makes possible the use of distributed capacities and makes relatively negligible normal leakages such as may occur in the system by reason of the fact that the resistances involved as parameters are comparatively low in comparison with the leakage resistances. The oil reservoir analyzer, it will be evident, provides an elaborate type of electrical configuration or network which, broadly, is typical of a general type of configuration to the analysis of which the invention is applicable.

It is recognized that an electrical analog to an oil reservoir may be provided by a system in which resistance is the analog of a function of permeability and viscosity, capacity is the analog of a function of fluid compressibility and porosity, current is the analog of flow rate of fluid, and potential is the analog of pressure. The model in accordance with the present invention comprises two major parts and controlling devices therefor. One of these parts is a scaled oil zone of the reservoir which takes the form of a device having distributed resistance and capacitance and geometrically similar, from the standpoint of horizontal directions, to the actual oil zone. This model is bounded by one or more equipotential surfaces and is provided with analogs of wells, the current withdrawals through which are controlled in accordance with a predetermined program.

The second major part of the apparatus comprises a network which simulates water drive conditions and which provides input to the equipotential boundary or boundaries of the oil zone model. While this network could have distributed parameters, it may be readily demonstrated that refinements in this direction are unnecessary, and that, to a quite sufficient degree of accuracy, lumped parameters may constitute the network.

To indicate the general nature of the results attainable by the oil reservoir analyzer there may be referred to a typical system which has been constructed in which, using a 250 cycle repetition rate, a period of fifty years is represented by the transients occurring in 2000 microseconds with an accuracy such that there may be determined the conditions existing during some particular period of ten days during the fifty years. The analyzer, in fact, is capable of giving results to an accuracy better than that generally justified by the field data which, at the present time, may be presented for its setting.

All of the objects indicated above and further objects of the invention, relating particularly to details of construction and operation, will become apparent from the following description read in conjunction with the accompanying drawings, in which:

Figure 7 is a detailed diagram of one of the well control circuits shown in block form in Figure 1;

Figure 8 is a diagram illustrating a typical current-withdrawal program occurring in a cycle of operation;

Figure 11 is a circuit diagram illustrating a simplified analyzer provided in accordance with the invention and suitable for use where a somewhat lower degree of accuracy of results may be tolerated.

Figure 1:
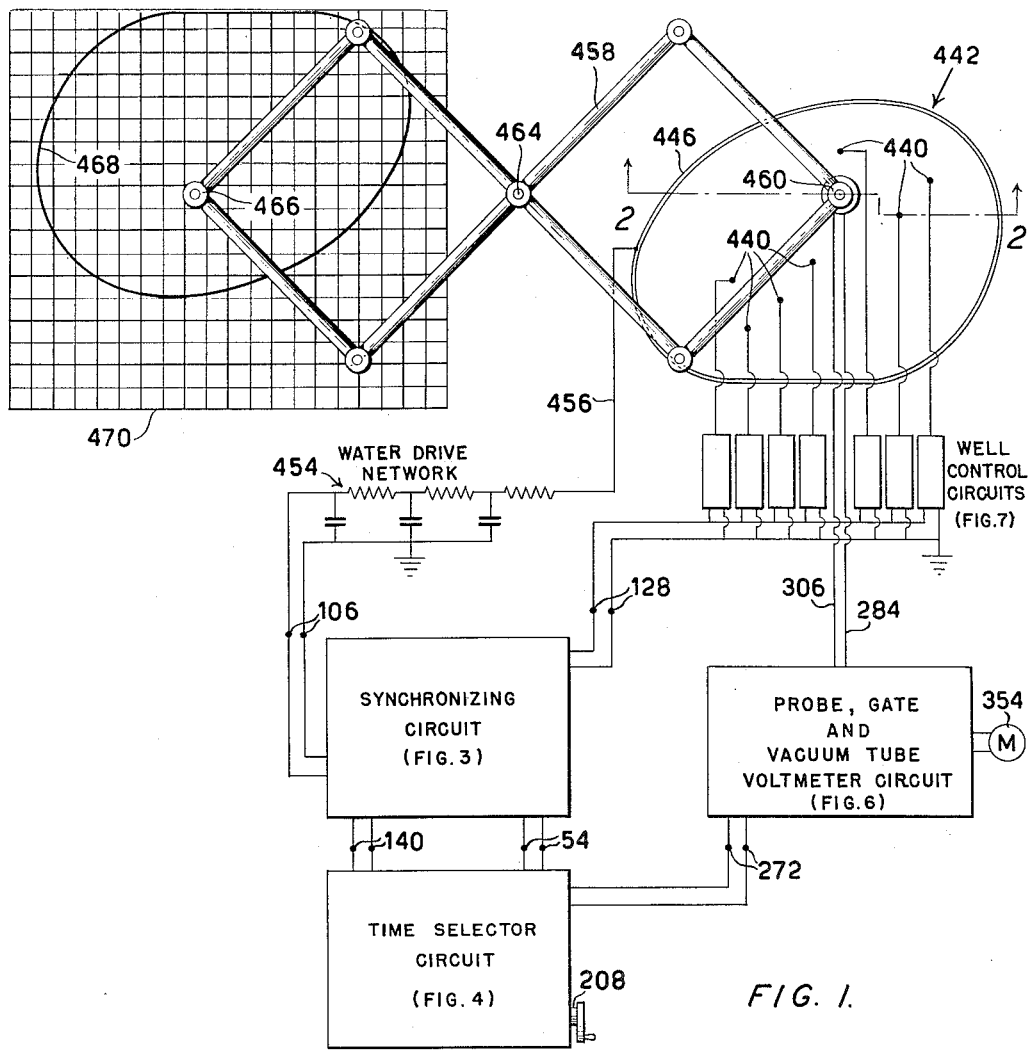
Figure 1 is a diagram of the analyzer as a whole, there being illustrated therein the model reservoir, the pantograph-mounted probe therefor, and in block form the various associated electrical elements of the analyzer.

The overall operation of the preferred and precise apparatus will be best made clear if there are first considered the details of the constructions and functions of various component parts, these parts being then considered as elements having particular inputs and outputs and associated to provide the complete apparatus. The first of such parts to be considered is the synchronization circuit illustrated particularly in Figure 3.

This circuit is powered through a positive line indicated at 2 between which and ground there are connected, in series, a resistor 4 and a gas filled voltage regulating tube 6 at the anode of which there will appear a regulated positive potential. This potential is delivered through the lines 10 and 12 the former of which includes a thermal relay switch 8 controlled by a heating coil 9 powered from a low voltage source.

An oscillator is provided by a pentode 14 in conventional circuit arrangement with a crystal 16 and a tuned circuit comprising a coil 18 and a condenser 20. It will be assumed that this oscillator operates at a frequency of 100 kilocycles and the remainder of the description will be consistent with this frequency though, as will be readily apparent, this frequency and related frequencies are quite arbitrary so long as they are mutually consistent.

The output from the oscillator is delivered through condenser 22 to drive a cathode follower, including the triode 24, the output of which is delivered through a condenser 26 to a frequency divider giving rise to an output at 10 kilocycles. This frequency divider includes a pair of tubes 28 and 30 associated with a pair of tuned circuits, one comprising a coil 32 and condenser 34 tuned to a frequency of 10 kilocycles and the other of which comprises a coil 36 and condenser 38 tuned to 90 kilocycles. A connection between one of the grids of tube 28 and the anode of tube 30 is effected through resistor 42 and condenser 40. An output connection 44 to the anode of tube 28 is connected through a condenser 46 and resistor 48 to the control grid of the tube 30. Various other connections are provided as indicated and it will be recognized that this arrangement provides a frequency divider having a division ratio of 10 of the type which is described in an article by F. R. Stansel in the Proceedings of the I. R. E. of April 1942, such a divider being also illustrated in Terman "Radio Engineering," third edition, page 595. As will be clear from these publications, the circuit having its resonant components tuned as indicated will provide highly stable frequency division giving rise to a relatively pure sine wave at the 10 kilocycle frequency.

A line 50 connects the line 44 to a cathode follower circuit including the triode 52 and the input circuit comprising the coil 51 and condenser 53 tuned to 10 kilocycles, the output at 10 kilocycle frequency being supplied to the terminals 54, the connections to which by other apparatus will be hereafter described.

The output from the frequency divider which has been described is further divided by a factor of 10 by a second frequency divider which comprises the modulator tube 58 and pentode 60 connected in the fashion previously described with inclusion of the tuned circuit comprising the coil 62 and the condenser 64 tuned to 1 kilocycle and the resonant circuit comprising the coil 66 and condenser 68 tuned to 9 kilocycles, the input to the modulator being from the line 44 through the condenser 56.

The 1 kilocycle output from this second divider is delivered through condenser 70 to a limiter and clipper circuit comprising the pair of diodes 74 and 76, the connection from condenser 70 being made to the anode of the first diode through resistance 72. The cathode of this first diode 74 is connected to ground through the resistor 80 and also through resistor 78 to the line 12 at the controlled potential mentioned above. The output from the circuit just mentioned, in the form of approximately rectangular positive pulses, is delivered to a differentiating circuit including the condenser 82 and resistance 84 feeding the control grid of a pentode 85 the anode of which is fed from the high voltage line 2 through the radio frequency choke 86 and resistor 88 in parallel. The resulting pulses from this circuit are delivered through connection 90 to a multivibrator for division by a factor of 4 to give rise to a 250 cycle per second output. This multivibrator, indicated generally at 92, comprises a pair of triodes 94 and 96 in a conventional circuit which performs in known fashion as described, for example, in Terman "Radio Engineering," supra, page 588.

The output from the multivibrator 92 is delivered through connection 98 to a pentode 100 having both an anode load resistor 111 and a cathode load resistor 112. The signals from the anode are delivered through condenser 102 to the control grid of triode 104 provided with a cathode resistor 105, the grid of tube 104 being connected to the anode of a diode 108, the potential of the cathode of which is adjustable through the medium of the potentiometer 110 connected between the line 12 and ground. The resulting output provided at the terminals 106 is a square wave which is zero at zero time (as will be better defined hereafter) and remains zero for 2000 microseconds, then rises suddenly to a fixed value determined by the adjustment of the potentiometer 110, remaining at this fixed value for another 2000 microseconds then again suddenly dropping to a zero value, the frequency of the complete cycle being, of course, 250 cycles per second.

The screen of pentode 100 is connected through line 113 to the screen of a pentode 114 while the cathode of pentode 100 is connected through line 115 to the cathode, control grid and suppressor grid of tube 114 through the line 115. The anode of the pentode 114 is connected through a load resistor 116 to the positive line 2 and the cathode of this pentode 114 is connected through resistor 118 to ground. This pentode provides phase reversal and its output is delivered through condenser 120 to the grid of triode 122 having a cathode load resistor 126. The grid of triode 122 is connected to the anode of a diode 124, the cathode of which is connected to a positive regulated potential which may be that of the line 12. It will be noted that the tubes 122 and 124 are similar in arrangement to the tubes 104 and 108 and deliver to terminals 128 a square wave, which, however, is not adjustable in amplitude. The phase is 180° different from the phase of the square wave appearing at the terminals 106, i. e., at zero time the wave rises to a fixed potential at the ungrounded terminal 128 remaining thereat for 2000 microseconds and then dropping to zero, remaining at zero for another 2000 microseconds.

The anode of the tube 114 is connected at 130 to a differentiating circuit comprising the condenser 132 and resistor 134 delivering a differentiated pulse to the grid of triode 136 associated with the cathode load resistor 138 and delivering an amplified pulse to the terminals 140. At zero time a positive pulse appears at the ungrounded terminal 140 which may have a duration of about 5 microseconds, this pulse repeating at a rate of 250 pulses per second, the beginning of the pulse defining the zero time of each cycle of duration of 4000 microseconds.

Figure 3:
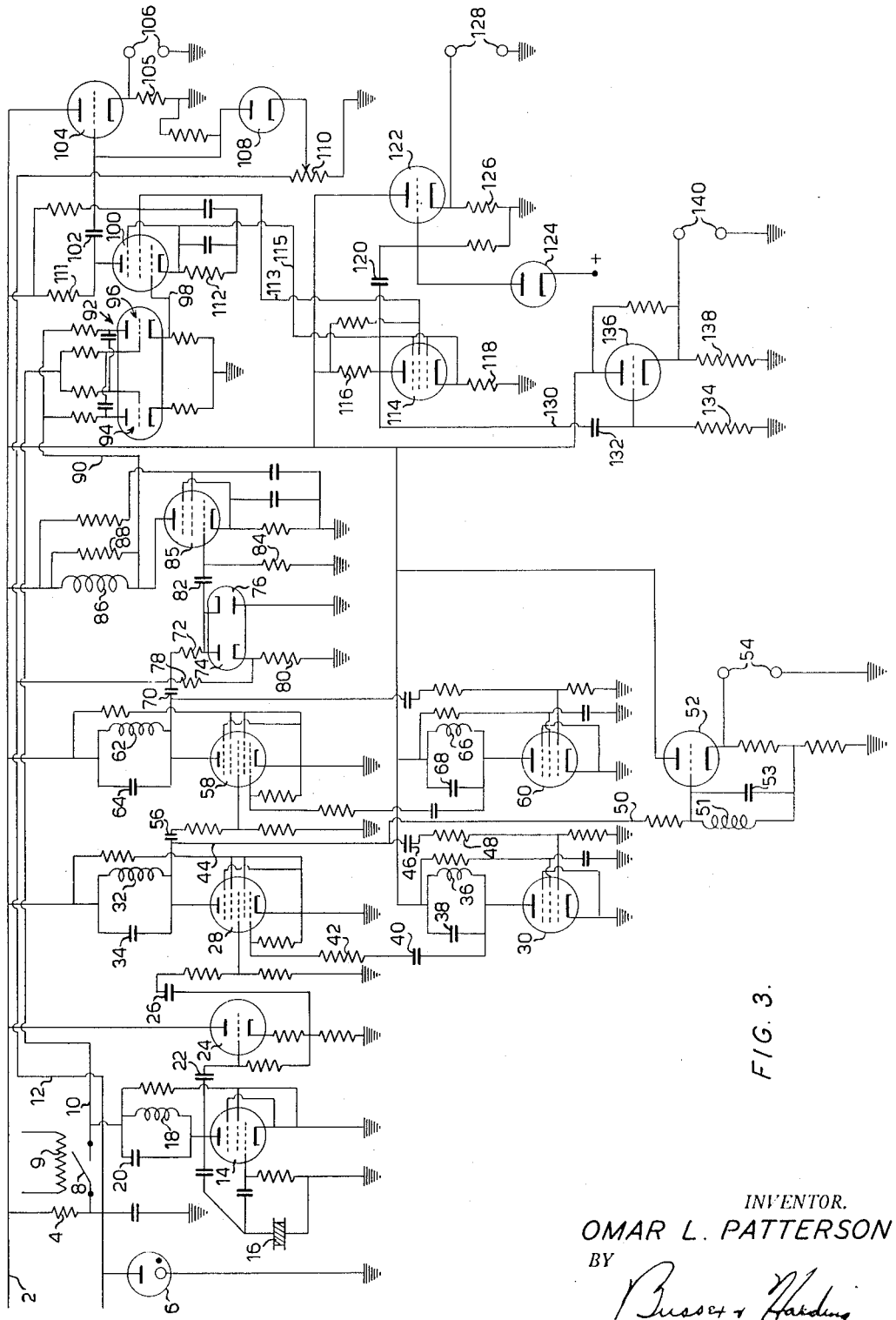
Figure 3 is a detailed diagram of the synchronizing circuit shown in block form in Figure 1.

The functions of the circuit arrangement of Figure 3 may now be summarized as follows:

It defines by the beginning of the pulse delivered at terminals 140 a zero cycle time as just described.

It delivers at terminals 106 and at terminals 128 square waves, the former being adjustable in amplitude, which are of opposite phase and which involve changes at the beginning of each 4000 microsecond cycle and at the middle of this cycle at 2000 microseconds. The upper terminal 106 rises to a positive value at the time equal to 2000 microseconds. The upper terminal 128 rises to a positive value at zero time and drops to a zero value at the time equal to 2000 microseconds.

A sine wave having a frequency of 10 kilocycles is delivered at the terminals 54. As will become evident this wave need not have any definite predetermined phase relationship to the other outputs of Figure 3, in the sense of adjustability, but actually the phase relationship remains fixed to a quite high degree of constancy since the outputs at terminals 106, 128 and 140 are derived from the divider giving the 10 kilocycle output and the phases of the subsequent frequency dividers hold constant phase relationships to the 10 kilocycle wave.

Figure 4:
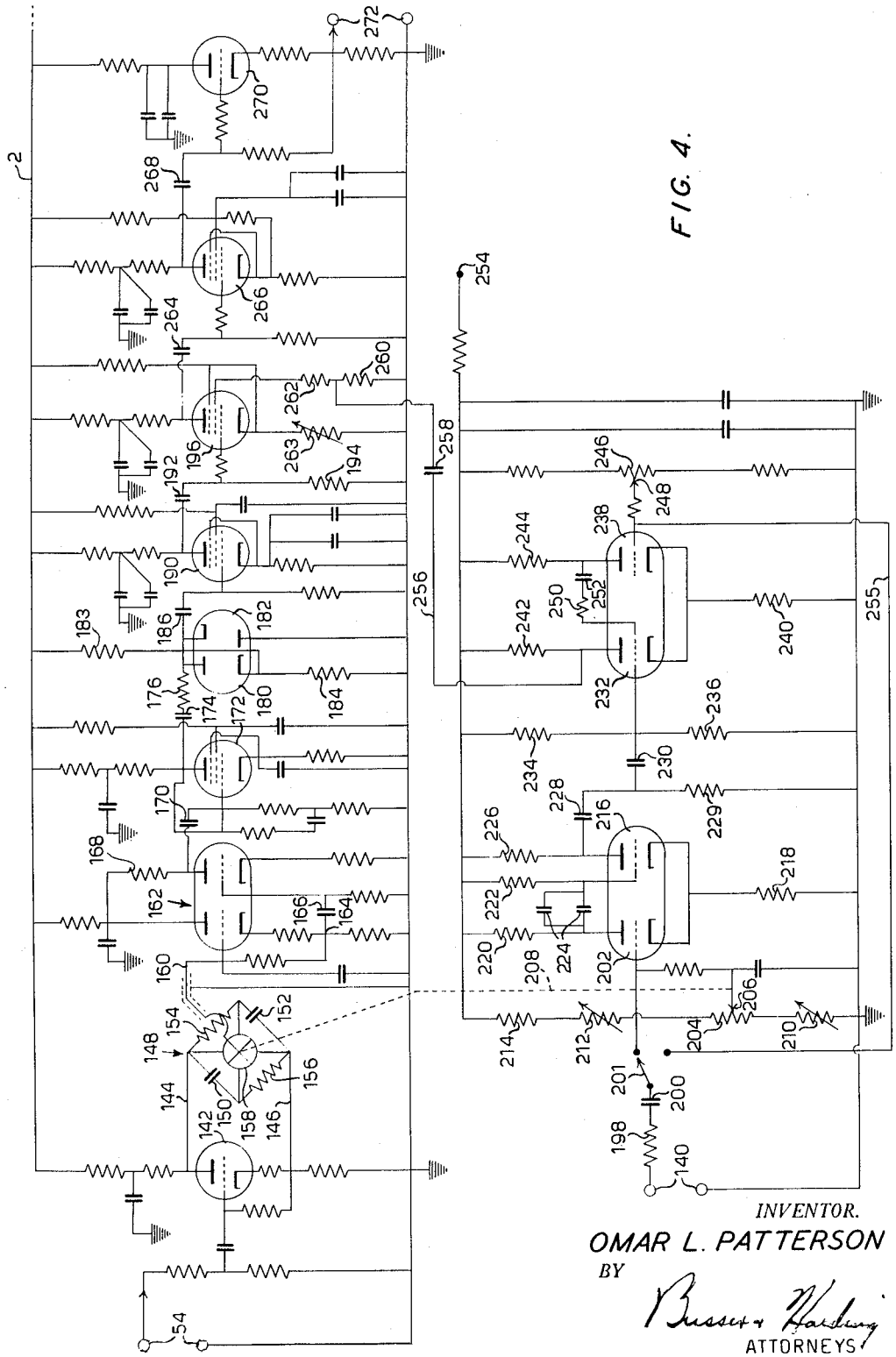
Figure 4 is a detailed diagram of the time selector circuit shown in block form in Figure 1.

Reference may now be made to Figure 4 which illustrates a time selector circuit the purpose of which is to provide a sharp pulse of adjustable width, say from ½ microsecond to 4 microseconds at a time, in a cycle of 4000 microseconds length, adjustable through a range from 1 to 3000 microseconds in the cycle with an accuracy of adjustment within 1 microsecond. As will be apparent later such pulses are required in the apparatus for very accurate time selection.

The terminals 54 previously described, at which appear a sine wave at a frequency of 10 kilocycles per second, provide the input to an amplifier comprising a triode 142 having both anode and grid resistance networks and supplied with high voltage direct current from the line 2. The anode and grid circuits are connected through leads 144 and 146 to a phase shifter indicated generally at 148. This phase shifter comprises a bridge arrangement of a pair of fixed condensers 150 and 152 and a pair of fixed resistors 154 and 156 which arrangement supplies four quadrature phases of the 10 kilocycle wave to the fixed quadrature plates of a rotary phase shifting condenser indicated at 158 which is of a known type as described, for example, in Terman "Radio Engineer's Handbook," first edition, page 949. The arrangement is such that an output provided between the line 160 and ground at the frequency of 10 kilocycles is continuously variable in phase by rotation of the shaft of the condenser 158 with an accurately linear relationship between angular displacement of the shaft and phase angle, the phase being shifted 360° for a complete revolution of the condenser shaft. A calibrated dial carried by the shaft may then be used to indicate to a high degree of precision the shifted phase so that the zero of the wave may be adjusted to an accuracy of 1 microsecond through the wave length of 100 microseconds.

The output of the phase shifter is amplified through a conventional amplifier 162 comprising a pair of triodes, the point 164 of the cathode resistance arrangement of the first being coupled through the condenser 166 to the control grid of the second, with the output taken from the anode of the second provided with the load resistor 168. This output is delivered through condenser 170 to a second amplifier comprising the pentode 172 and conventional connections and thence through the condenser 174 to the square wave former comprising the diodes 180 and 182. The cathode of the former is connected to the high voltage supply line 2 through a resistor 183 and to ground through the resistor 184. The square wave output is delivered through condenser 186 to the control grid of a pentode 190 in a conventional amplifying circuit and the output of this amplifier is fed to a differentiating circuit comprising the condenser 192 and resistor 194. The junction of this condenser and resistor is connected to the control grid of a tube 196 functioning as a gate, the delivery of a pulse being controlled by an elongated pulse applied to the screen of this pentode and provided in the fashion now to be described.

The terminals 140, previously described in connection with Figure 3 and providing a short pulse at a repetition rate of 250 cycles per second and defining the zero of the time cycle, provide an input through resistance 198, condenser 200 and a switch 201 to a gate pulse forming arrangement. The switch 201 has alternative upper and lower positions and, as will be described in detail hereafter, is at most times in the upper position the result of which position will be first outlined.

A regulated positive high voltage supply line extends from a terminal 254 through a suitable filter and has connected between it and ground a fixed resistor 214, a variable resistor 212, a potentiometer 204 and a variable resistor 210. The variable resistor 212 provides a tracking adjustment and the variable resistor 210 provides a zero timing adjustment with purposes which will become clear hereafter. The potentiometer 204 is of a circular linear type to provide at the movable contact 206 a potential linearly related to the angular displacement of the shaft which carries the movable contact. This movable contact shaft is connected to the shaft of the phase shifting condenser 158. In a preferred arrangement the shaft of the condenser 158 is manually turned and carries a worm meshing with a worm gear on the shaft of contact 206, the worm and gear being such that a turn ratio of 30 to 1 is provided. The result is that, the 204 of the potentiometer forming substantially a complete circle, a complete rotation of the shaft of contact 206 occurs in 30 revolutions of the shaft of condenser 158 with the result that, as will become clearer hereafter, a total pulse time delay from zero time may be effected up to 3000 microseconds, this full range being attained through the use of the switch 201 as will be later described, the switch 201 being controlled by a cam on the shaft of the contact 206 so that for the first 6° of rotation of that shaft the switch will be in its lower position and during the remainder of a rotation it will be in its upper position.

The switch in its upper position provides connection between the upper terminal 140 and the grid of a triode 202 which is associated with a second triode 216 in a single shot cathode-coupled multivibrator circuit. This circuit includes a common resistor 218 for the two triodes, a resistor 220 connecting the anode of the triode 202 with the high voltage line, a resistor 222 connecting the grid of the triode 216 with the high voltage line, a resistor 226 connecting the anode of triode 216 to the high voltage line, and a parallel arrangement of condensers 224 connecting the anode of triode 202 to the grid of triode 216. The action of this single shot multivibrator is fundamentally conventional and, in brief, takes place as follows:

The triode 216 is normally conducting as will be evident from the fact that its grid is connected to the high voltage positive line, the triode 202 being normally cut off. A positive pulse at the control grid of triode 202 will overcome its cathode bias, rendering it conductive and lowering its plate potential which in turn lowers the potential of the grid of triode 216 by virtue of the capacitive couplings 224. The drop in grid voltage of triode 216 results in a reduction of cathode voltage which in turn reduces the cathode bias on triode 202 rendering the latter more conductive. This process is cumulative until triode 202 is fully conducting, with a plate potential determined by the grid voltage obtained at 206, and triode 216 is cut off. The sudden drop in plate potential of triode 202 is delivered to the grid of triode 216 driving this grid considerably below its cut-off value relative to the cathode. Condensers 224 then begin to charge toward the positive voltage supply through resistor 222 until the grid potential exceeds the cut-off value at which time the action is reversed and tube 216 becomes conductive again, cutting off tube 202 with a return to the initial state. The result is that a time, predetermined by the circuit constants, elapses between the introduction of a pulse through terminals 140 and the return of the multivibrator to its initial condition. An elongated pulse is thus emitted to the condenser 228 from the anode of the triode 216, this pulse being differentiated by the differentiating network provided by condenser 228 and resistor 229. As will shortly appear a negative pulse resulting from differentiation of the end of this positive pulse is utilized.

The last mentioned negative pulse follows the onset of the pulse at the terminals 140 by a time delay which is approximately linearly related to the position of the contact 206 of the potentiometer 204. That this delay is adjustable will be clear from consideration of the fact that the attainment of the end of the multivibrator pulse is dependent upon the period of flow of current through the resistor 222 necessary to charge the condensers 224 to a potential exceeding that of the potential of the grid of triode 202 which is adjusted by variation of the contact. If the potential of the grid of triode 202 is high a relatively small degree of discharge of the condensers occurs and, consequently, the multivibrator pulse will be short; whereas if the potential is low the pulse will be correspondingly elongated. The circuit arrangement is such that the negative differentiated pulse which is emitted to the condenser 230 may be delayed up to 2955 microseconds, approximately. The delay will be approximately linearly related to the angular position of the shaft of contact 206.

The condenser 230 is connected to the junction of a pair of resistors 234 and 236 which are in series between the positive high voltage line and ground and this junction is further connected to the grid of a triode 232 associated with a triode 238 in a single shot multivibrator circuit. The cathodes of these triodes are connected together and through a resistor 240 to ground. The anodes of the two triodes are connected through resistors 242 and 244 to the positive supply line. The anode of triode 238 is connected to the grid of triode 232 through resistor 250 and condenser 252. The grid of triode 238 is connected to the contact 248 of a potentiometer 246 forming part of a resistance network between the positive high voltage line and ground.

The adjustment of this last mentioned multivibrator is such that the triode 232 is normally conducting and the triode 238 is normally cut off. A positive pulse arriving at the grid of triode 232 is without effect, this positive pulse occurring at zero time in the cycle. A negative pulse, on the other hand, will cut off triode 232 and will effect conduction of triode 238. Discharge of the condenser 252 will occur and the original circuits of the two triodes will only be restored when recharging occurs sufficient to raise the potential of the grid of triode 232 above the potential of the grid of triode 238. There will accordingly be produced at the anode of triode 232 a positive pulse which begins with a negative pulse applied to the grid of this triode and has a duration determined by the setting of the contact of potentiometer 248. This is set so that the duration of the positive pulse at the anode of triode 232 is approximately 90 microseconds.

Consideration may now be given to the lower position of the switch 201. Under this condition of the switch a positive pulse at the upper terminal 140 will be applied through connection 255 to the grid of triode 238 with precisely the same results in the multivibrator as are produced by the application of the negative pulse to the grid of triode 232. Accordingly, in this case the multivibrator will produce a 90 microsecond pulse at the anode of triode 232 beginning at zero time.

The 90 microsecond pulses provided in either fashion are delivered through connection 256 and condenser 258 to the junctions of resistors 262 and 260 connected between the screen of pentode 196 and ground. As will be described the 90 microsecond positive pulse applied to the screen will serve as a gate for the delivery of a coincident short pulse at the control grid of pentode 196 to provide a pulse through the condenser 264 to the control grid of pentode 266 which is in a conventional amplifying circuit. The output pulse width may be controlled to some extent through adjustment of the variable resistor 263 in the cathode circuit of the pentode 196. The output of the amplifier 266 is taken from its anode through condenser 268 to an output cathode follower circuit including the triode 270 with resulting delivery of a positive pulse at the output terminals 272.

Figure 5:
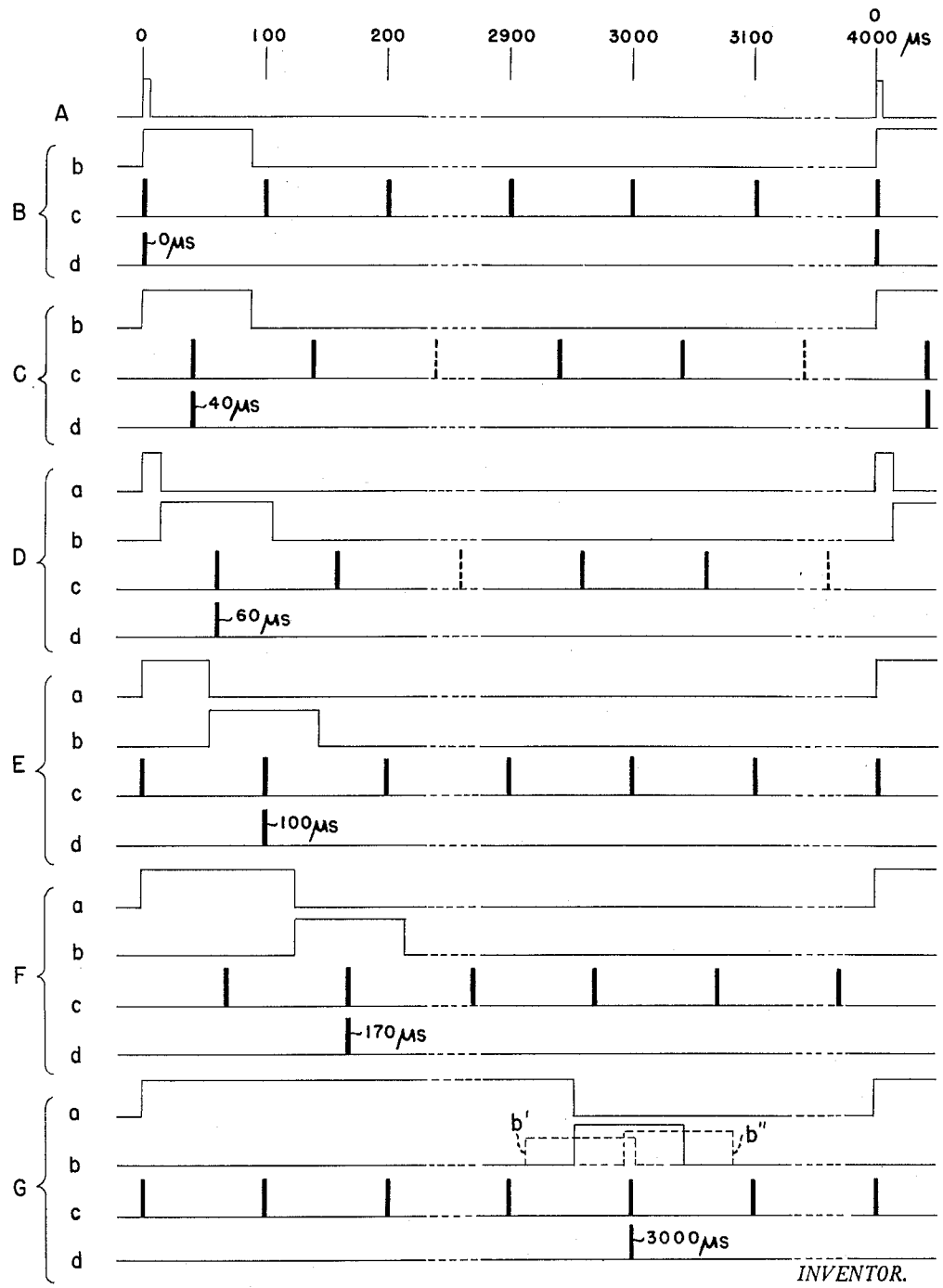
Figure 5 is a diagram explanatory of the operation of the time selector circuit.

That the positive pulse delivered at the upper output terminal 272 occurs only once in a complete 4000 microsecond cycle and may be very precisely timed in this cycle will become apparent from consideration of the diagram of Figure 5 which will now be described.

The time scale of this figure is shown in three portions, the first extending from zero time past 200 microseconds, the second showing the region in the vicinity of 3000 microseconds and the fourth showing the region in the vicinity of 4000 microseconds which is the zero of a subsequent time cycle having a repetition rate of 250 cycles per second.

At A there is indicated the repetition of the 5 microsecond pulse emitted at terminals 140, the beginning of which always establishes the zero time for a cycle.

First, there will be considered, in connection with B, what occurs to provide the emission of a pulse at the terminals 272 at zero time. At this time the switch 201 will be in its lower position so that the positive pulse entering at upper terminal 140 will act directly on the grid of the triode 238. At B there is indicated the positive 90 microsecond pulse emitted on the line 256 to the screen of the gate tube 196, this pulse beginning essentially at zero time. The pulses applied to the control grid of the pentode 196 are indicated at B*c*, the initial adjustments being such that when the shaft of the phase shifting condenser 158 is at zero position these pulses are at zero phase angle. As will be evident the coincidence of the two pulses applied to the pentode 196 will rise to a pulse at zero time emitted at the terminals 272 as indicated at B*d*.

Assume now that by turning the shaft of condenser 158 the pulse phase is shifted, but the turning movement applied to the shaft of the potentiometer contact 206 is not sufficient to throw the switch 201 to its upper position. The pulse emitted on the line 256 will be the same as before as indicated at C*b*. The pulses applied to the control grid of pentode 196 will be delayed in phase to a degree linearly proportional to the angle of rotation of the shaft of condenser 158. These pulses are indicated at C*c*. As will be evident the pulse emitted in each time cycle will again be determined by coincidence of the two pulses applied to gate pentode 196 so that the pulse emitted at terminals 272 will be as indicated at C*d* at a time phase of 40 microseconds.

If the shaft of the condenser 158 is further turned, for example, past the position causing a pulse delay of 50 microseconds the cam on the shaft of potentiometer contact 206 will effect the shift of the switch 201 to its upper position so that a somewhat different action will occur as indicated at D. The pulse applied at zero time at upper terminal 140 will now be delivered to the grid of triode 202 and, as has been described, will render triode 202 conductive and will cut off triode 216. The result is a positive pulse appearing at the anode of the triode 216 which will terminate after a predetermined delay which is fixed by the position of the potentiometer contact 206. The pulse appearing at the anode of triode 216 is indicated at D*a*. As has been pointed out the rise of this pulse has no effect, giving rise to a positive pulse through the differentiating circuit to the grid of triode 232 which is normally conducting. At the termination of this pulse, however, a negative pulse is emitted cutting off the triode 232 for a period of 90 microseconds, causing a positive pulse of this strength to be emitted on the line 256 as indicated at D*b*.

The phase of the pulses applied to the grid of pentode 196 is indicated at D*c* and it will be evident that the emitted pulse at 272 will be as indicated at D*d*, for example, at a time of 60 microseconds.

As will now become evident, the pulse indicated at D*b* will travel along the time scale at approximately the same rate at which the pulses at D*c* are displaced in phase. Desirably adjustments are so made that the pulse such as D*b* will be symmetrical about the pulses D*c*. Preliminary adjustments of the resistors 212 and 210 will effect this condition to a fair approximation if the potentiometer 204 is of linear type.

In further explanation of the operation there are illustrated at E the conditions which arise when the shaft of condenser 158 makes one complete revolution corresponding to a 360° phase shift of the phase shifter output. At E*a* there is indicated the more elongated pulse appearing at the anode of triode 216. This produces a corresponding delay of initiation of the 90 microsecond pulse emitted on the line 256 indicated at E*b*. The 360° phase shift has now brought the pulses at E*c* to the same time positions as at B*c*, but it will now be seen that the emitted pulse indicated at E*d* will be emitted at the time 100 microseconds since only at this time is there coincidence of the pulses applied to the gate tube 196.

At F*a*, F*b*, F*c* and F*d* there are indicated the conditions of the pulses heretofore referred to when there is emitted a pulse at a time of 170 microseconds. It will be noted that the pulse F*b* continues to progress toward the right in substantial alignment with the shift of the pulses F*c*. This shift continues through the entire range of the apparatus until finally there occur the conditions indicated at G*a*, G*b*, G*c* and G*d* where there are illustrated the conditions giving rise to the emission of a pulse at the terminals 272 at the time 3000 microseconds. It will, of course, be evident that the range up to 3000 microseconds delay is quite arbitrary, but in the apparatus described, corresponds to a complete rotation of the shaft of potentiometer contact 206. Beyond this position the time delays may be repeated beginning again at zero.

The use of the 90 microsecond pulse as a gate insures, first, that it will not effect the issue of more than one pulse in a cycle at the terminals 272 and, second, provides for the possibility of a reasonable departure from precise accuracy of tracking of the accurately timed pulses appearing at the control grid of tube 196 by the gating pulses applied to its screen. For example, as will be evident, at *b'* and *b"* of the group of curves G the tracking may well involve either cumulative lead or lag which might cause the 90 microsecond pulse to appear finally in either of these positions or any intermediate positions. Thus, the accuracy of the timing of the delayed pulse becomes dependent almost solely on the accuracy of construction of the condenser 158 in providing linear conformity between its shaft movements and the phase angle of its output; in fact, slight departures from linearity may be taken care of by accurate calibration of the scale of this condenser even if a non-linear relationship exists.

It may be seen, in short, from the above that there may be produced, as the result of the circuit of Figure 4, at the upper output terminal 272 a positive pulse readily timed to an accuracy within 1 microsecond throughout a complete delay range of 3000 microseconds.

Figure 6:
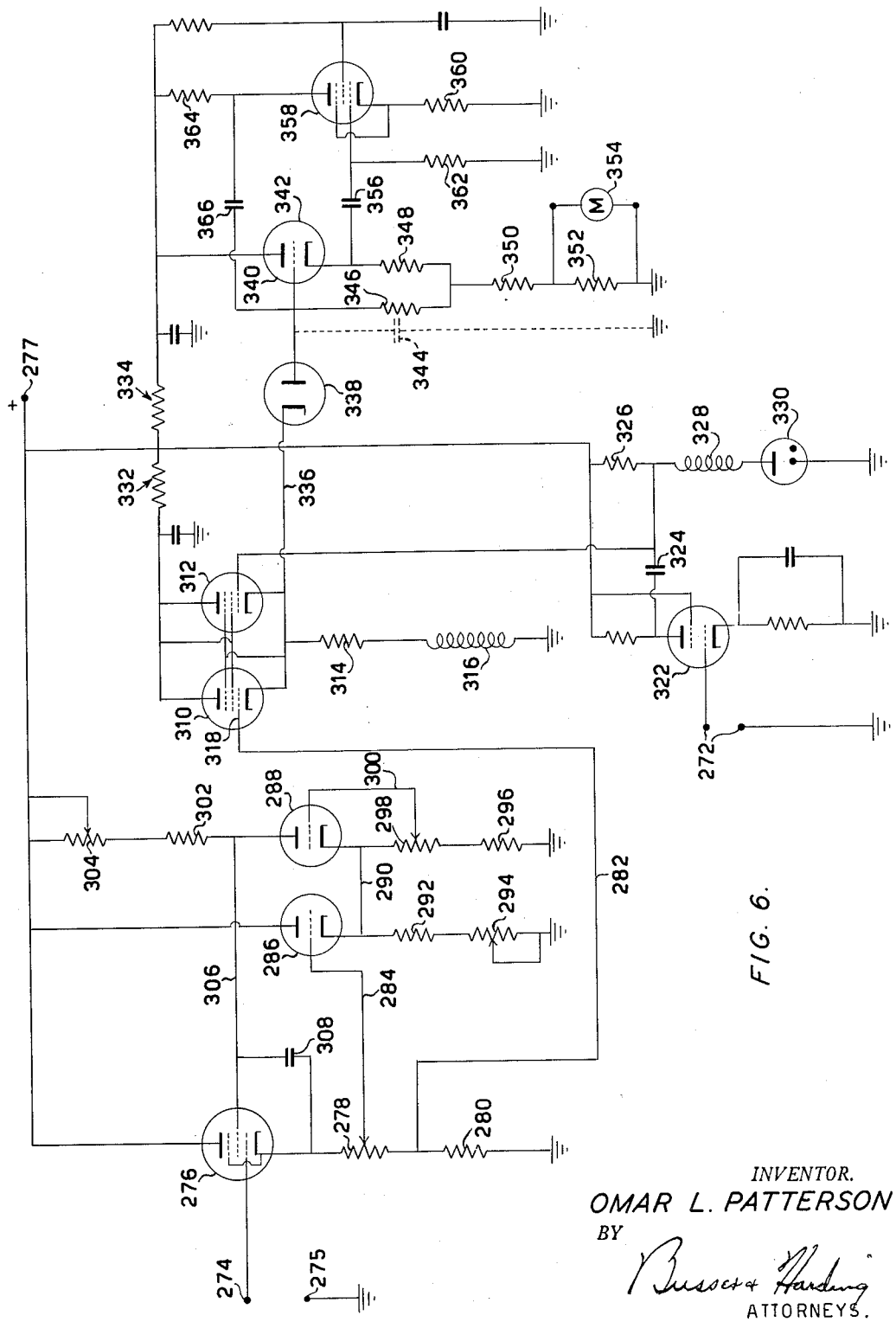
Figure 6 is a detailed diagram of the probe, gate and vacuum tube voltmeter circuit shown in block form in Figure 1.

The apparatus involves the use of one or more vacuum tube probes for measurements of potentials which are periodic with a frequency of 250 cycles per second. It is desired to measure these potentials at particular instants corresponding to those of the pulses emitted at the terminals 272. Figure 6 shows the circuit of a probe and the circuit of a vacuum tube voltmeter associated with the probe and under the control of the accurately timed pulses just mentioned. The elements of Figure 6 are described in detail in the applications of Edward W. Yetter, Serial No. 62,383 and 75,851 filed respectively November 27, 1948, and February 11, 1949. Reference may be made to said applications for details and, in the present case, these circuits will be only briefly described with indications of their properties and functions.

The probe arrangement has a high input impedance and is of a type which makes possible measurements of potentials existing in circuits which must be subjected to a minimum of disturbance by the measuring apparatus. In brief, the probe has a very high input resistance and very low effective shunt capacitance and has a substantially flat frequency response over a range from zero to the order of a megacycle or more. It is also substantially linear in its response to a quite wide range of potential.

The input tube of the probe circuit is a pentode 276 which is preferably of the 954 type since this tube has closely linear characteristics, has a very low input capacitance, and is particularly adapted to mounting in a small space with simple association with a probe wire connected to its control grid. This probe wire is indicated at 274. The second input terminal 275 is constituted by the ground of the apparatus undergoing measurement. A direct potential is applied to the anode of the tube 276 from a positive terminal 277 of a direct current power supply, for example, providing 250 volts. The cathode of the tube is connected through a potentiometer 278 and a fixed resistor 280 to ground. The output of the probe is delivered between connection 282 and ground, the connection 282 leading to the ungrounded end of resistor 280.

In order that the output between terminal connection 282 and ground should be linearly related to the input potentials throughout a wide range thereof, it is necessary to control the screen potential and this is accomplished through the use of a two-stage amplifier including the triodes 286 and 288 which may be constituted by the two elements of a single tube such as a 12AU7, although separate tubes may be used. The grid of the triode 286 is joined to the contact of potentiometer 278 by a connection 284. The cathodes of the triodes 286 and 288 are connected together as indicated at 290. Between these cathodes and ground is a resistance which, for convenience of providing various adjustments, is constituted by a group of resistances including the fixed resistors 292 and 296, a variable resistance 294 and a potentiometer 298, the contact of which is joined to the grid of the triode 288 through connection 300. The resistors 292 and 294 may be of relatively low value, for example, giving a total over-all resistance from the cathodes to ground of the order of 6000 ohms, while the potentiometer 298 and resistor 296 may be of high resistance value thereby giving rise to the possibility of the use of a convenient size of potentiometer at 298. The anode of triode 286 is connected directly to the positive power supply terminal 277. The anode of the triode 288 is connected to the same terminal through a fixed resistor 302 and a variable resistor 304. Consistent with the other values indicated the total resistance here involved may be of the order of 60,000 ohms. The anode of the triode 288 is connected to the screen of the pentode 276 through the connection 306. This screen is joined to the cathode of tube 276 through a large condenser 308 having a value, for example, of 0.1 microfarad. The arrangement described provides an effective shunt input capacitance of very low value, for example, of the order of 0.01 micromicrofarads. An input resistance greater than $10^9$ ohms may also be easily secured by the exercise of ordinary care in insulation of the input lead. Substantial linearity between input and output is obtained for inputs ranging up to 100 volts, this end being achieved through the control of the potential between the screen and the cathode of the pentode 276. The portion of the circuit so far described is discussed in greater detail in the application of Yetter, Serial No. 62,383 previously referred to.

As will be evident, if a cyclic potential is applied to the input probe terminal 274 a potential linearly related thereto will appear at the probe output connection 282. For purposes of the present apparatus it is desirable to sample this periodic potential at a particular phase instant and the remainder of the circuit of Figure 6 is designed to accomplish this end under control of the pulse emitted from the terminals 272 previously described.

A pair of pentodes 310 and 312 are connected in parallel, except for their control grids, in a cathode follower circuit including the cathode resistor 314 and preferably a high frequency choke indicated at 316. The input to the grid 318 of the tube 310 is provided from the probe output terminals 282. This input consists of the periodic potential previously mentioned, a particular ordinate of which is to be measured.

The positive pulses emitted at the terminals 272, of the pulse generating circuit previously described, are applied to the control grid of an amplifier tube 322 in a conventional resistance-coupled amplifier circuit, a corresponding amplified negative pulse being delivered through the condenser 324. The condenser 324 is connected to the junction of a resistor 326 and a choke 328 which, in turn, connects with the anode of a voltage regulating tube 330 of the gas-filled type, which tube, so long as current is flowing, will have its anode maintained at a substantially constant potential above ground. The choke 328 provides a substantial A. C. impedance to ground, the voltage regulating tube having a very small A. C. impedance. The anode supplies to the tubes 322 and 330 are from the positive potential terminal 277 from which terminal an anode potential may be supplied also the anodes and screens of the tubes 310 and 312 through a filter 332 and also to the anodes and a screen of a pair of tubes hereafter described, through a second filter 334. These filters 332 and 334 are to eliminate from the tubes supplied therethrough surges which may appear at the terminal 277 because of the pulses of current flowing in the tube 322.

The connected cathodes of the tubes 310 and 312 are joined through connection 336 to the cathode of a diode 338 which is illustrated as of the thermionic vacuum type though this may be replaced by a germanium crystal or other rectifier of known types. The anode of the rectifier 338 is connected to the grid 340 of a triode 234. For purposes of analysis of operation it may be considered that there is a condenser 344 between this grid and ground, but in actual construction and operation the capacity at this point may be provided solely by the grid-cathode capacity in the tube 342 and other incidental capacities of the wiring, tube mounting, etc. The tube 342 is in a cathode follower circuit including the resistances 348, 350 and 352 between cathode and ground. Between the grid 340 and these cathode resistors there is a very high impedance 346 which may, for example, have a value upwards of 20 megohms.

A measuring meter conventionalized at 354 is connected across the resistor 352. This may be merely a direct current voltmeter or it may be a recording potentiometer, or the like. At an rate, the output is measured by the current flowing between the cathode of tube 342 and ground or by a potential measured across some part or all of the resistance between cathode and ground.

The cathode of tube 342 is connected through the condenser 356 to the control grid of a pentode 358, the cathode of which is connected to ground through a resistance 360 while the control grid is connected to ground through the resistance 362. The anode of the tube 358 is provided with the load resistor 364 and is connected through the condenser 366 with the grid of the tube 342. As will be evident from considering the application of Yetter, Serial No. 75,851, referred to above, the tube 358 and its connections provide a dynamic capacitance arranged to be large under static conditions to suppress ripple, but small under changing conditions to give a rapid response in the circuit.

The operation of this sampling circuit is described in detail in said Yetter application, Serial No. 75,851 and need not be referred to herein, except briefly as to its results. The periodic potential which is applied at the probe input 274 is, under control of the pulse at the terminals 272, sampled at an instant corresponding in each cycle to the time of occurrence of this pulse, and at the meter 354 there will appear a reading which is a measure of the ordinate of the input potential at the desired instant determined by the timing pulse. As pointed out in detail in said Yetter applications, the meter will give a reading which is very accurately linearly related to this ordinate. Despite the fact, therefore, that the periodic input potential is applied at a frequency of 250 cycles per second a very accurate measurement of the particular ordinate may be made without dependency upon the accuracy of operation and observation of a cathode ray oscilloscope. It is, of course, desirable for check on the operation of the entire apparatus herein disclosed that one or more oscilloscopes be provided connected at various critical points to the apparatus; but, as will appear as the description proceeds, the controls and measurements are not at all dependent upon the accuracy of reading such oscilloscopes. Since they may be connected to the apparatus in fashions well known in the art, and since they are essentially unnecessary, they are not herein illustrated.

It may be here noted that if the meter 354 is of the automatic recording type exhibiting its results, for example, in the form of a curve traced by a pen on a moving paper chart, a curve of meter reading versus time may be automatically secured by connecting the chart drive mechanism with the timer drive 208 so that the two are synchronized in predetermined fashion. If the chart drive is, as usual, sufficiently slow with respect to the repetition rate of the cycle, an accurate curve having time as its ordinate will then be drawn. This, it may be noted, is a result practically unattainable with analog systems having relatively long time constants which are still sufficiently short to make the systems practical, since in such systems the attainable time constants will be too short to conform with the speeds of chart movement and pen response of conventional automatic recorders.

The apparatus involves the simulation of well production through the controlled withdrawal of current from the reservoir through electrodes which are at locations simulating the locations of wells. During each cycle the withdrawal of current at each well location is controlled in accordance with a predetermined pattern, for example, such as indicated in Figure 8. This figure indicates that up to a time $t_1$ a particular well is not producing. At time $t_1$ it is put into production at a rate which is simulated by the current $i_1$. The production then decreases exponentially until at $t_2$ the production rate is measured by $i_2$. Then a change of rate occurs as represented by the next exponential curve with further changes in change of rate at $t_3$ and $t_4$, as indicated by the curves following the points $i_3$ and $i_4$. At $t_5$ production ceases by reason of the attainment of zero by the exponential line starting at point $i_4$. $t_6$ is marked merely to indicate the end of the production cycle corresponding, consistently with what has been heretofore stated, to 2000 microseconds. In brief, the well control circuits about to be described may be used to give, by suitable adjustment, a substantially unlimited number of production patterns of the type just indicated with the possibility of abrupt changes in production rates as well as changes in rates of decrease of production. The segments of exponential curves, including the possibility of substantially horizontal segments, are initiated in sequence at predetermined times and each may be adjusted as to amplitude, duration and slope constant.

Referring to Figure 7 there are indicated the terminals 128 previously described at which, as has been pointed out, there is produced in each cycle a rectangular wave rising to a constant amplitude at zero time and dropping to zero at 2000 microseconds, remaining at zero thereafter through the cycle. This wave is applied through condenser 368 to the grid of triode 370 which, together with the triode 372, is in a one-shot multivibrator circuit. The cathodes of the two triodes have a common cathode resistor 374 and the circuit of the cathode of triode 372 contains an additional resistor 376 shunted by condenser 378 with connection of the cathode to the contact 384 of a potentiometer 382, the upper end of which is connected to the grid of the triode 372 which is coupled to the anode of triode 370 through condenser 380. The anodes of the two triodes are connected through load resistors 371 and 373 to the positive supply line. The output of the multivibrator is delivered from the anode of the triode 370 to an input terminal 386 of a differentiating circuit comprising the condenser 388 and resistor 390, the latter being connected to a biasing line 392 which is common to a number of circuits which duplicate each other except for values of their parameters.

The junction between condenser 388 and resistor 390 is connected to the grid of a triode 394 which is associated with a triode 396 in another single-shot multivibrator circuit. This circuit corresponds to the single-shot multivibrator circuit already described except for possible differences in the values of its parameters. The anodes of the triodes are connected to the positive supply line through load resistors 395 and 397. The cathodes have a common resistor 398 and the anode of triode 394 and the grid and cathode of triode 396 are interconnected, as previously described, by the network comprising resistor 400, condenser 402, potentiometer 404, its contact 406 and condenser 408. The output from the anode of triode 394 is delivered through connection 410 to the input terminal 386' of a single-shot multivibrator of a next following stage, which, being identical with that just described, has its parts designated by the same reference numerals with primes appended thereto. The output of this multivibrator in turn is delivered through line 410' to the input terminal 386" of still another stage. As will be evident, any number of these single-shot multivibrators may thus be arranged in cascade with, as pointed out hereafter, successive operations to determine intervals of time such as those between $t_1$ and $t_2$, $t_2$ and $t_3$, $t_3$ and $t_4$, etc.

Except for the first of the single-shot multivibrators comprising the triodes 370 and 372, the multivibrators are connected to circuits which determine amplitude and rate of exponential drop of potentials applied to a single well simulating tube. Considering the multivibrator including triodes 394 and 396, the anode of the latter is connected to a network comprising a pair of condensers 412 and 418 the latter of which is in series with a potentiometer 416 and a resistor 419 running to ground. The condenser 412 is connected to the contact 414 of potentiometer 416 and through condenser 420 to both the anode and grid of a triode 422 which functions as a diode and, of course, could be replaced by a diode. The cathode of triode 422 may have its positive potential adjusted by reason of its connection to the contact of a potentiometer 424 which is in a resistance circuit running from the positive supply line to ground. The grid and anode of tube 422 are connected to the grid of a triode 426 and through resistor 428 to ground. The triode 426 is in a cathode follower arrangement including a resistor 430 connected between cathode and ground. The cathode of triode 426 is connected to the control grid of a pentode 432 which functions as a well tube, this pentode being desirably of a 954 type arranged as a cathode follower with the resistance 434 and low voltage battery 436 (of, for example, 6 volts) between its cathode and ground. A battery 438 provides a screen potential. The anode of pentode 432 is connected to the well electrode 440 extending into the simulation of the oil zone of the reservoir.

The subsequent single-shot multivibrators are connected to diode-cathode follower circuits similar to that already described and indicated by similar reference numerals with primes appended. The only difference is that the triodes such as 426' do not have individual cathode resistors but, as will be clear from the diagram, have their cathodes connected to the cathode of triode 426 so that the resistor 430 acts as a common cathode resistor. All of the connected cathodes are joined to the control grid of the pentode 432.

The foregoing indicates the type of circuit arrangement associated with each of the well electrodes. As will become apparent, the various wells may have completely independent current production patterns. There will now be described the operation to give rise to a pattern of the general type indicated in Figure 8.

In each of the multivibrators the left-hand triode is normally cut off and the right-hand triode is conducting. The rise of the pulse applied at the terminals 128 renders the triode 370 conducting and the triode 372 non-conducting. The shift to this condition provides a negative pulse at the terminal 386 which is differentiated and applied to the grid of the triode 394, but since a negative pulse is applied to the grid there is no effect on the second multivibrator.

The condition of conductivity of triode 370 and cut-off of triode 372 is maintained for a time dependent upon the setting of the contact 384 of potentiometer 382. At the end of this time the multivibrator shifts back to its initial condition with the triode 370 cut off and the triode 372 conducting. A positive pulse is then emitted from the anode of the triode 370 which, by differentiation, applies a positive pulse to the grid of triode 394 to flip the second multivibrator to a condition of conductivity of triode 394 and cut off of the triode 396. This, in turn, emits a negative pulse to the terminal 386' which produces no effect at the third multivibrator. However, after a delay in time, dependent upon the setting of the contact 406, the second multivibrator reverts to its original condition and a positive pulse is emitted to the terminal 386' which is differentiated and applied to the grid of triode 394' flipping the third multivibrator. As will be evident, this action is repeated successively through the series of multivibrators so that each determines a succeeding period of abnormal condition to provide a series of time intervals of the type indicated in Figure 8.

As each multivibrator is flipped to its abnormal condition it initiates an exponential output as follows:

As the second multivibrator is flipped to its abnormal condition a positive pulse is applied to the network including the condensers 412, 418 and 420 and the potentiometer 416 and resistor 419. A positive potential is thus applied to the grid of the triode 426 which is limited in amplitude by the diode provided at 422 the cathode of which has its potential fixed by the setting of potentiometer 424. The potential of the grid of the triode 426 then decreases substantially exponentially at a rate which is determined by the setting of the contact 414 of potentiometer 416. Through the cathode follower action a corresponding potential is applied to the control grid of pentode 432 to produce a corresponding varying current flow through the well electrode 440. Thus, during the interval of abnormal condition of the second multivibrator the current flow through the well electrode is subject to predetermined control.

A similar action is repeated when each of the subsequent multivibrators is in its abnormal condition. The return of each multivibrator to normal condition effects cut off of its corresponding triode 426, the result being that only one of the triodes 426, 426', etc. is at any time conducting so that the pentode 432 is under successive control by these triodes. It will thus become evident that a current flow pattern of the type indicated in Figure 8 is secured, this current flow pattern being subject to control through the various potentiometer adjustments as to initiation, duration and slope of its various segments.

It may be here noted that in the original setting of the adjustments of the well control circuits of the type just described the probe and time sampling circuit, heretofore described, may have its input connected, for example, to the cathode of the pentode 432 to perform extremely accurate measurements of potential at accurately measured times, thus making possible the very accurate setting of the pattern. This same end could be accomplished by making measurements through utilization of a cathode ray oscilloscope, and, of course, such an oscilloscope may be desirably additionally used as a visual check on the adjusting operations. With the various tubes properly heated up and adjustments carefully made, the well control circuit will repeat its cycle to a high degree of reliability, and once set, may be maintained in a condition of consistent repetitive operation.

The various circuit elements which have so far been described are, of course, subject to being varied in fashions which, in the light of the foregoing descriptions, will be apparent to those skilled in the electronic arts. Changes may be made quite generally in such matters as the tubes utilized, alternative constructions of multivibrators, gates, frequency dividers, phase shifters, wave shape formers, and the like, variations of which elements are well known in the art. Accordingly, in many respects the specific disclosures of details are to be regarded as illustrative and as not specifically limiting the scope of the invention.

Reference may now be made to Figure 1 which shows the various elements of the Figures 3, 4, 6 and 7 in block diagram form and in association with other elements to provide a complete oil reservoir analyzer.

Figure 2:
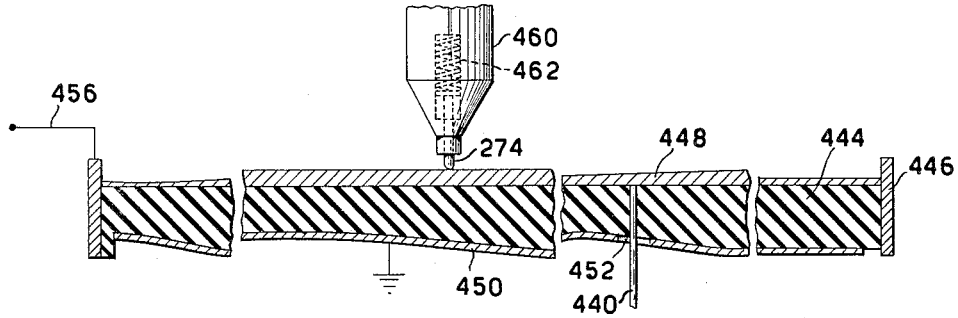
Figure 2 is a section through the model reservoir and the probe taken on the broken surface indicated at 2—2 in Figure 1.

At 442 there is illustrated an oil reservoir model which may take various forms but which is preferably of the form illustrated particularly in Figure 2. An insulating plate 444, which may be of a plastic composition of substantial rigidity and high insulating qualities, has a boundary which, as illustrated, is surrounded by a conducting rim or border 446. This conducting rim or border is of metal of good conductivity so that it is in the electrical analog an equipotential contour corresponding to a contour of pressure equipotential of an actual field. In the case of any actual oil field there can be determined such a contour from the known data concerning the field structure. Of course, if data is meager, it may be necessary to assume such an equipotential contour at greater distance from the producing wells and, in the case of fairly uniform subsurface structure conditions, such an equipotential may be assumed to be a circle having as its center approximately the center of a group of wells and at a sufficiently great distance from the group. In any event, such a contour should be chosen, taking into consideration proper scale conditions, on the basis of the best assumptions which may be made therefor. It may be noted that this equipotential contour may be actually split up in the form of various segments of salient or reentrant portions particularly if there are known to exist in the reservoir faults or other structures which cause the reservoir to depart very substantially from symmetry about the well group.

The insulating plate 444 has a plane upper surface on which is located a layer of low conductivity material 448 which may be in the form of a relatively high resistance paint or the like. As is indicated in Figure 2 the thickness of this is variable so as to conform with known variations of permeability in the field, i. e., the local conductivity should conform in the model to the permeability of the corresponding portions of the actual field. To achieve this end the low conductivity paint may be applied in successive layers to build up the desired representation.

The undersurface of the insulating plate 444 is contoured as indicated in Figure 2 and is coated with a grounded coating 450 of good conductivity material such, for example, a layer of silver. This lower contouring of the plate 444 provides variations in local capacity between the upper coating 448 and the lower coating 450. It will be noted that the lower coating 450 does not connect with the equipotential conducting rim 446 which, however, is in conductive relationship with the coating 448.

Well leads 440 from the well control circuits are provided in the form of pins extending upwardly through the insulating plate 444 into conductive relationship with the coating 448. Where these pins pass through the bottom surface of the plate 444 openings 452 in the lower coating 450 are provided, which openings are sufficient in diameter to provide such clearances as will not produce local concentrations of capacity between the lower coating and the upper coating by virtue of the presence of the pins 440.

To summarize, the reservoir model is a scale model from the standpoint of horizontal dimensions of the reservoir and the locations of the wells therein. It involves distributed resistance and capacity to provide analogs of permeability-viscosity and fluid compressibility-porosity, respectively. The reservoir is bounded by one or more equipotential contours corresponding to contours which would be expected to remain equipotential during the operation of the reservoir (though the potentials of each such contour may be expected to change during the producing period).

The water drive effecting flow of oil in the reservoir could be simulated by an outward extension of the reservoir model also having distributed resistance and capacity.

However, it is found that this is quite unnecessary and simplicity may be achieved by simulating the water drive by a network of lumped resistances and capacities, as indicated at 454, this network being connected at 456 to the equipotential boundary rim 446. As indicated in Figure 1 the network 454 is energized from the terminals 106 of the synchronizing circuit of Figure 3.

The measurements which are of interest are those of potentials, representing pressures, at various points of the layer 448 of the model. These potentials are measured by the probe 274 which was described in Figure 6, which probe may take the form of a pin pressed downwardly by a spring 462 and connected to the grid of the tube 276 carried by a housing 460 connected through suitable leads to the remaining portions of the circuit of Figure 6. Conveniently the tube housing 460 is carried by a pantograph 458 having its fixed pivotal mounting at 464 and carrying a pointer 466 which may move over a graph sheet 470 on which the replica of the equipotential contour provided by 446 appears at 468. Such a pantograph arrangement makes it easily possible to locate the probe accurately at any desired point of the reservoir.

The operation of the analyzer may now be described. As will be already evident the electrical system is repeatedly driven through cycles of operation at a frequency which, consistent with what has been described, may be assumed to be 250 cycles per second. It will suffice to consider what occurs in one complete cycle since, as will have already become apparent, the repeated sampling of a potential at the corresponding phase point of successive cycles will make possible potential measurements at any such point just as if the cycle was arrested at such point. The cycle may be considered as beginning at the time therein corresponding to 2000 microseconds, considering zero time in the fashion previously assumed. During the interval from 2000 microseconds to 4000 microseconds (the last being zero time of the next cycle) an adjustable rectangular input potential is provided from the terminals 106 of the synchronizing circuit to the water drive network to effect the charging of the same with the result that at 4000 microseconds the equipotential contour is brought to the proper initial potential and the capacities in the water drive network are so charged that when the charging source is cut off the water drive network will thereafter provide a varying potential to the equipotential contour corresponding to the variation of pressure potential of the actual reservoir during the time period undergoing consideration.

At zero time the water drive network starts discharging into the reservoir model. At predetermined times thereafter, as provided by the programs preset in the well control circuits, the well leads 440 will withdraw current from the conductive surface 448, the conduction of current being in accordance with predetermined programs. It will be noted that through the use of the pentode at 432 the current withdrawal through each well lead is essentially independent of the potential at the well lead so that, for all practical purposes, a definite current withdrawal may be programed as would correspond, for example, to a definite pumping rate from an actual well.

Accordingly, through the period from zero to 2000 microseconds the discharge of the water drive network simulates the action of the actual water drive network in providing a variation of potential of the equipotential contour as current, simulating oil flow, is withdrawn from the reservoir model through the well leads. It may be here pointed out that if several equipotential contours or boundaries are provided, separate water drive networks may be provided for them, all having been powered from the terminals 106.

As will be evident from the description of the operation of the probe the time selector circuit may be adjusted so that, at any particular time instant in the range from zero to 2000 microseconds, the potential existing at the probe 274 may be determined, this corresponding, taking into consideration the time scale, to the pressure existing at any desired point of the reservoir at the corresponding time. Due to the stroboscopic nature of the operation this potential appears in the form of a direct current reading at the meter 354. There is, accordingly, no necessity for attempting to make any hurried readings during a variation of the potential being measured. If desired for a given program of the well control circuits the entire reservoir may be explored by the probe 274 to ascertain at any point thereof the complete history of variation of potential through the time period. As indicated above, the time from zero to 2000 microseconds may correspond to 50 years. Among the points thus explored may, of course, be the locations of the various wells.

The useful analysis, of course, involves determination of the potential (pressure) variations at various points in the reservoir for different programs of well production rates. While the analyzer is capable of giving many other types of significant results there may be mentioned the fact that it is particularly useful in showing conditions in which overproduction from a particular well may result in such lowering of pressure below the gas bubble point (generally a pressure about 80% of the original reservoir pressure) as would cause by-passing of oil by gas into the well bore, thereby materially reducing the ultimate recovery of oil from the reservoir.

That the reservoir analyzer will give informative results will become evident from the following discussion which will indicate the dimensional and other considerations involved in its design and will also serve as an illustration of the general nature of other analogs which may be analyzed in accordance with the invention.

The basic equation governing the pressure distribution as a function of time in a water drive oil reservoir is currently accepted to be:

$$\Delta^2 P = \frac{f \mu c}{K} \cdot \frac{\partial P}{\partial t}$$

in which $P$ is the pressure
$f$ is fractional porosity
$\mu$ is fluid viscosity
$c$ is fluid compressibility
$K$ is permeability of the reservoir sands through which oil and water are flowing This equation is based upon Darcy's law, which is the analog of Ohm's law in electrical circuits, the equation of continuity and the compressibility equation for slightly compressible fluids. The equation will be recognized as similar to the diffusivity equation of heat flow. It will be recognized that this equation in two-dimensional form also represents a distributed series resistance-shunt capacitance electrical network in which $$\frac{\mu}{K}$$

corresponds to electrical resistivity, $fc$ corresponds to distributed electrical capacitance per unit area, and P corresponds to electrical potential. Electrical current flow is the analog of rate of reservoir fluid flow. It will thus be seen that a water drive oil reservoir can be closely represented by a distributed electrical network such as indicated in Figures 1 and 2. The model, as previously described, consists of a dielectric material at the bottom of which is a good conducting surface and at the top of which is a poor conducting liquid or solid which furnishes a distributed resistive medium with distributed shunt capacitance to ground furnished from the top surface to the bottom surface through the dielectric material.

The corresponding equations for the reservoir and the electrical model are the following:

For the reservoir $$\Delta^2 P = \frac{14.7 \mu c f}{K} \cdot \frac{\partial P}{\partial t}$$

$$\bar{q} = -\frac{K}{\mu} d \cdot \Delta P$$

wherein:

$\bar{q}$ is vector volume rate of fluid flow per unit cross sectional area in cm.$^3$/sec.$\times$cm.
$P$ is pressure in lbs./in.$^2$.
$c$ is compressibility of fluid in in.$^2$/lb.
$f$ is fractional porosity.
$d$ is depth of sand in cm.
$\mu$ is viscosity in centipoises.
$K$ is permeability in darcys.
$t$ is in seconds.

In the electrical model:

$$\Delta^2 V = \frac{8.85 \times 10^{-14} \rho K_e}{h_1 h_2} \cdot \frac{\partial V}{\partial t}$$

$$\bar{i} = \frac{h_1}{\rho} \Delta V$$

wherein:

$\bar{i}$ is vector current per unit cross sectional area in amperes/cm.
$V$ is potential in volts.
$\rho$ is resistivity in ohm$\times$cm.
$K_e$ is dielectric constant.
$h_2$ is thickness of dielectric in cm.
$h_1$ is thickness of resistive layer in cm.
$t$ is in seconds.

The correspondence between the reservoir and the electrical model will be as follows:

Let $L$=ratio of voltage and pressure in volts/lb.$\times$in.$^{-2}$.
$t_0$=ratio of electric model time to reservoir time in sec./sec.
$S$=linear scale ratio between model and reservoir in cm./cm.
$M$=amperes/bbl.$\times$day$^{-1}$.

Then $$M = 27.0 \frac{h_1}{d} \cdot \frac{\mu}{\rho K} \cdot L$$

in amperes/bbl. day$^{-1}$, and $$t_0 = 6.02 \times 10^{-15} \frac{\rho K}{\mu} \cdot \frac{K_e S^2}{f c h_1 h_2}$$

in seconds (model)/sec. (reservoir).

These equations permit a considerable degree of latitude in the selection of electrical model constants to represent an oil reservoir. The electrical model may, for example, be made as illustrated in Figure 2 comprising a disc of methacrylate plastic (Plexiglas) having a dielectric constant of 3.5. The resistant material on top may be a solid conducting material of variable thickness, as has been described, or a conducting liquid having variable depth provided by contouring of the upper surface of the disc, with, for example, a ratio of resistivity to depth of $1.77 \times 10^3$ ohms. Under such conditions, with a thickness of the disc of the order of one-half to one centimeter, convenient values of scale ratios may be secured such that, for example, a pressure of one thousand pounds per square inch corresponds to 50 volts, one barrel per day corresponds to one microampere, one mile corresponds to one foot, and ten days of time for the oil reservoir correspond to one microsecond in the electrical model.

In setting up the electrical analog of a reservoir the thicknesses of the dielectric material and the resistive material may be contoured to correspond to variations in sand thickness, porosity, permeability, viscosity and fractional porosity. The geometry of the field may be scaled in the model with fault structures included as electrical insulators across which no current flows.

It will be apparent that if the reservoir geometry and distribution of constants are accurately known the electrical model may be made to be a very close analog of the actual reservoir.

Generally speaking, oil zone and water zone constants will be different and the contouring of the model should incorporate this difference in the two zones. In cases where the water zone may be considered as infinite, the model is extended to such a distance that the pressure decline at the periphery is less than the limiting error. The physical size of the model may be materially reduced by using a material of very high dielectric constant for the water zone and changing the linear scale factor in this zone to correspond. In most cases, however, it will suffice to use a network of lumped resistance and capacitance to represent the effect of the water beyond a conveniently selected size of model having distributed resistance and capacitance. Each section of such a lumped system would represent the resistance and capacitance associated with a given zone. Such a lumping of parameters in a water drive network is illustrated in Figure 1. To complete the representation, at the beginning of each cycle the entire model is charged to a potential corresponding to the original reservoir pressure and the current is withdrawn from (or may be introduced to) each well electrode in accordance with a given schedule of production, or possibly introduction, of liquid through a well such as would affect other wells in the vicinity. It may be noted that in the event that it is considered that a constant pressure may exist at some remote point of the water drive network, a constant potential may be provided in the corresponding region of the analog.

In the foregoing it has been assumed that the electrical analog is constructed to conform with data secured from the actual field. Sometimes, the constants of the field may not be too well known as a result of extreme difficulties in analyzing the significance of the pressure and flow relationships from time to time noted in the actual field. The analyzer may be used in a somewhat inverse fashion to secure information concerning the geometry and properties of the actual field at a time corresponding in the model to the time of securing field data by first making the best assumption possible from the field data and by then manipulating the model by changing its geometry, resistivities, capacities, etc., so as to secure in the electrical analog operating conditions corresponding to possibly isolated elements of the field data. In other words, the analyzer may be used not only to predict future conditions of a field but also to determine the present condition of a field, which determination might otherwise require substantially more data than is available, or might involve calculations of prohibitive complexity. In this way, for example, the diffusivity constant $$\frac{f \mu c}{k}$$

may be determined by adjusting the model constants so that the effect of "shutting-in" a well electrode agrees with the results obtained from field pressure measurements in affected wells.

While the invention has been particularly described with reference to an electrical analog of an oil reservoir, it will be evident that it is of much broader application to the solution of problems in which electrical potentials, currents and parameters may be used to represent other physical quantities in problems such as those relating to hydraulic or heat flow, or the like. In particular the invention makes possible the construction and operation of such electrical analogs in which resistances, capacitances, and inductances of relatively low values may be used in view of the small time constants involved with resulting elimination of expensive and bulky apparatus, the necessity for exercising precautions against leakage and the necessity for sufficiently slowing down changes in the measured variables so that accurate readings may be made during the variations. In particular the invention makes feasible the use of distributed parameters when such distributed parameters lead to more accurate results than are obtainable by their approximation by lumped parameters.

It will also be evident that various features of the invention may be used for the accurate measurement of transients in original electrical systems, i. e., which are not merely the analogs of some other system but, in effect, their own analogs, for example, the measurement of transients which may occur in transmission line problems or the like. In particular there is useful in this respect the time selector circuit and the probe and vacuum tube voltmeter circuit which make it possible to pick out a particular phase instant of a transient phenomenon and make accurate measurements at such instant in a cyclical repetition of the transient. As will be evident from the circuits indicated, the frequency of cyclical repetition may, if desired, be much greater than the 250 cycles per second repetition rate which has been particularly mentioned. Apparatus provided in accordance with the invention is capable of providing much greater accuracy of measurement both as to time and the ordinate of a function variable with time than can be achieved through the use of a cathode ray oscilloscope.

Figure 9:
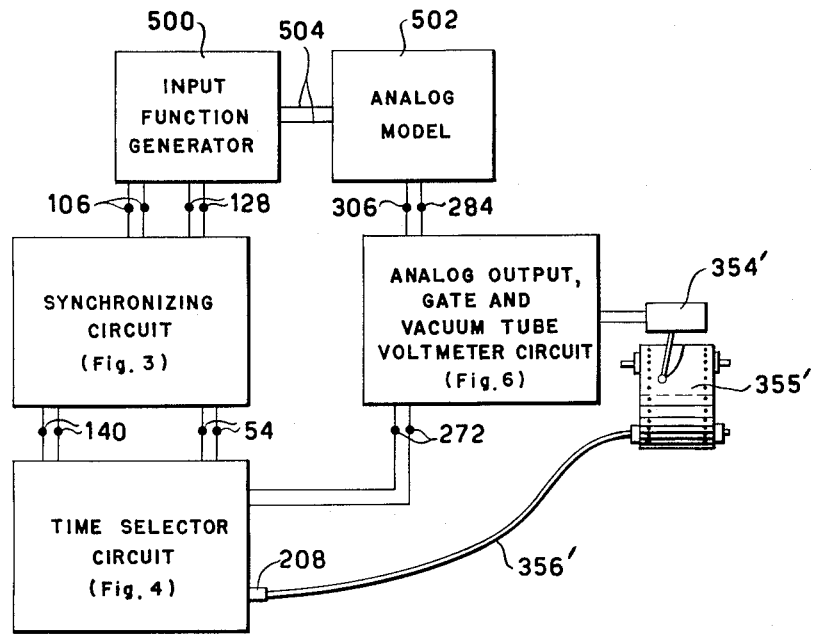
Figure 9 is a block diagram making clear the more general applicability of the invention to transient analysis.

The more general applicability of the invention may be indicated by reference to Figure 9 which represents, in block form, a generalization of the apparatus previously described. The synchronizing circuit of Figure 3, the time selector circuit of Figure 4 and the analog output, gate and vacuum tube voltmeter circuit of Figure 6 are here indicated interconnected as in Figure 1 and will require no further description. The block 500 is designated an input function generator and, in the device previously described, this would be made up of the water drive network 454 and the well control circuits of Figure 7, these being controlled by the connections 106 and 128 from the synchronizing circuit.

An analog model is generally indicated at 502 and, in the arrangement previously described, this would, of course, comprise the reservoir analog designated generally at 442 and including the well electrodes. The output was delivered to the arrangement of Figure 6 through the probe.

In the generalization of the invention, however, the input function generator at 500 may comprise any of an enormous variety of devices for the introduction of a time variable input function to the analog model 502 through connections indicated at 504 which may well comprise any plurality of input channels. For example, the input function generator 500 may be any of many known types of wave generators producing desired wave shapes the response to which of the analog model may be desired. Such generators are, for example, described in chapters 7 and 8 of "Waveforms" by Chance et al., forming volume 19 of Radiation Laboratory Series published by McGraw-Hill Book Company, Inc. As pointed out in said chapters, many waveforms may be produced, by suitable apparatus, of triangular, rectangular, trapezoidal, exponential, hyperbolic, step, sinusoidal, or other forms. As pointed out in said chapters, all of these may be initiated by triggering pulses such as produced by inputs through connections 106 and/or 128 from the synchronizing circuit of Figure 3.

The analog model 502 may also be of an enormous variety of forms including lumped and/or distributed linear and/or non-linear components. As simpler examples, an analog model at 502 may consist merely of a simple circuit consisting of lumped parameters or a simple transmission line analog, or the like, the response of various points of which to a step function provided by the input function generator 500 may be desired, the probe in such case being connected to the point the response of which to the input function is desired. In such a case the analog involved may be merely provided by an electrical circuit itself in the form of its own analog. On the other hand, there may be provided at 502 an electrical analog of some non-electrical or only partially electrical system such as a hydraulic, acoustic, heat flow, control, or other system.

From the above it will be evident that the invention is very broadly applicable in its aspect of providing a repetitive cycle of operation with the possibility of reading off a response at any desired phase of the repetitive cycle. There is secured the very pronounced advantage that, by reason of the use of small time constants, correspondingly small electrical parameters may be involved and, in particular, distributed parameters which could not be involved except by lumped approximations involving large time constants.

In Figure 9 there is illustrated what has been mentioned before, namely, an automatic plotting of response through the use of a recording meter 354' in the location of the meter 354 arranged to trace a curve on a chart 355' which may be advanced through a connection 356' from the time selecting shaft 208 so as to give directly a recorded curve of response against phase in the repetitive cycle. By this arrangement there may be plotted, for example, the variation of a potential existing in a network which has applied to it a step or other input function. It will, of course, be evident that, while a probe of the type described actually responds to potential, the reading may be made of current merely by measuring the potential across a resistance through which a current flows. As has been discussed, the probe of the type which has been described has a very high input impedance and may quite generally be connected to an electrical network without appreciably changing its characteristics.

Figure 10:
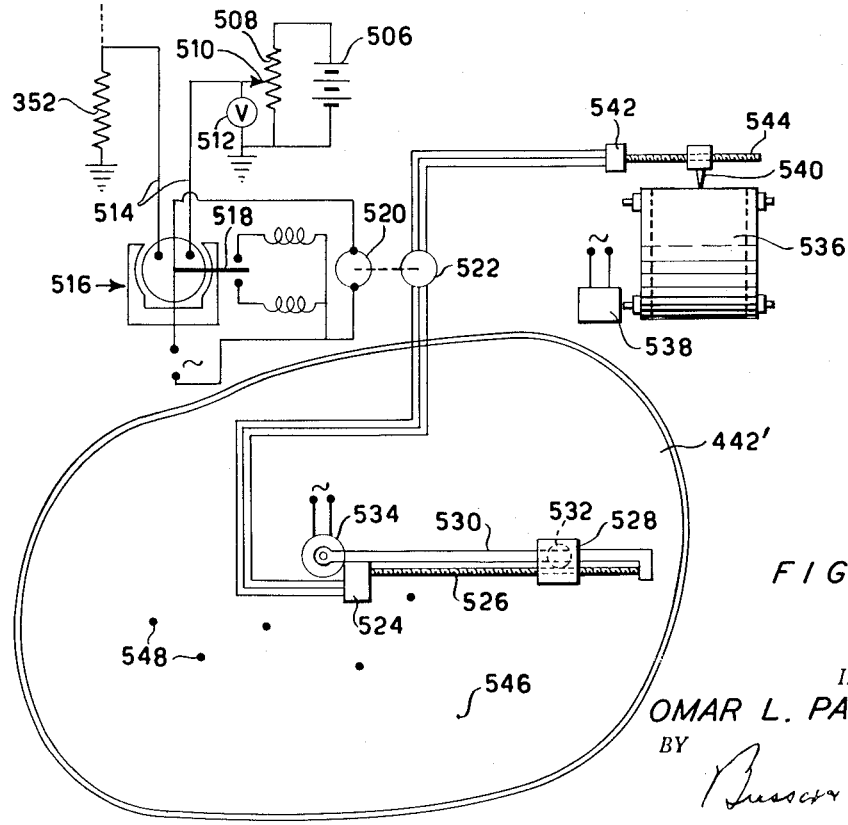
Figure 10 is a diagram illustrating the manner in which equipotential contours may be automatically traced on a representation of an oil reservoir for any given time.

Reference may now be made to Figure 10 which illustrates an arrangement particularly useful in connection with an analog model such as of an oil reservoir in which it may be desirable to plot equipotential lines. Suppose, for example, it is desired to plot the location of an equipotential line of a particular given potential on the area of a model 442' similar to 442 of Figure 1. A battery 506 is connected to a potentiometer resistance 508 the contact 510 of which is set to the desired potential as read on a meter 512. Lines 514 connect the potentiometer contact 510 and the upper end of resistance 352 of Figure 6 with the coil of a relay 516, the switching arm 518 of which moves between a pair of contacts controlling field windings for effecting reversing operation of a motor 520. If the potentials applied to the lines 514 are equal, the motor will be stationary. On the other hand, the motor will run in one or the other direction to attain balance if the potentials applied to the lines are different. The motor 520 drives a selsyn transmitter 522 which drives a selsyn receiver motor 524 in turn driving a screw 526 to traverse along an arm 530, a carrier 528 of a probe 532 making contact with the reservoir analog surface in the fashion illustrated in Figure 2. The arm 530 may be slowly rotated by an electrical clock motor indicated at 534. As will be evident, if the polar drive of the arm 530 is sufficiently slow, the point of the probe will follow an equipotential line on the surface 546 of the reservoir analog when a system of the type previously described and illustrated in Figure 1 is used. Whenever the probe 532 departs from the desired equipotential line, it will be restored to that line through the operation of the motor 520. The equipotential line will thus be traced for a particular phase instant in the repetitive cycle of operation.

While the probe itself may be in the form of a stylus carrying ink and thus serving directly to mark the surface 546 of the reservoir analog, it will be evident that the equipotential may also be plotted as a curve on a chart 536 by a stylus 540 driven by the screw 544 from a second selsyn motor 542 driven by the selsyn transmitter 522, the chart 536 being advanced by a clock motor 538 in synchronism with the clock motor 534. As compared with the arrangement of Figure 1, equipotential contours may thus be automatically secured as compared with point-by-point plotting thereof through the manual manipulation of the apparatus of Figure 1.

The analyzer heretofore described is capable of providing very high accuracy of measurement but is quite complex. In many instances a lesser degree of accuracy may be tolerated and the invention may then be embodied in comparatively simple apparatus. Figure 11 shows such a simpler apparatus in a form particularly suitable as a generally useful laboratory instrument.

In this apparatus a pair of triodes 550 and 552 are connected to form a conventional free running multivibrator the frequency of which is adjustable by the positioning of the contact 554 of the potentiometer 556 which applies an adjustable positive bias to the grids. The operation of such a multivibrator is known and will be found described on page 588 of Terman's "Radio Engineering," third edition. This multivibrator accordingly provides a controllable repetition frequency. The square wave produced at the anode of triode 552 is differentiated by condenser 558 and resistance 560 when the switch 562 is in its upper position. In its lower position this switch may be connected to a line 564 from an external trigger source which may be provided under some circumstances as will be indicated hereafter. In either case, the resulting negative trigger is applied through diode 566 to the anode of a triode 568 which is interconnected with a second triode 570 in a conventional cathode-coupled monostable or single shot multivibrator capable of producing a positive wave form at the anode of triode 570 of controllable width determined by the position of the contact 572 of the potentiometer 574. This type of multivibrator is described in "Radio Engineering," supra, page 590 and in "Waveforms," supra, page 170. The wave form appearing at the anode of triode 570 may be rectangular, exponential, or approximately sawtooth depending upon whether a switch 578 connected to the output line 576 is open or connected to a particular one of a group of condensers 580, 582, 584 and 586 which selectively determine the rate of exponential rise and fall of the potential at the anode of triode 570. The output wave is delivered through condenser 588 to the cathode follower including the triode 590 and is delivered through the output line 592. From the foregoing it will be evident that the output wave delivered at 592 may be controlled as to repetition frequency, as to its width, and as to its shape, the latter depending upon the position of the switch 578. The wave forms indicated are of most general use, but it will be evident that other wave forms may be provided by the substitution, for the condenser switching arrangement illustrated, of more elaborate wave forming components such as described in chapters 7 and 8 of "Waveforms," supra.

At 594 there is indicated by a block an analog to which the output wave form is delivered through connection 592. The term analog is here used in the general sense referred to above to indicate any type of electrical configuration, whether representative of some non-electrical or partially electrical configuration or not, the response of which to the introduced wave form is required.

The trigger produced at switch 562 is delivered through connection 596 to a differentiating arrangement comprising condenser 598 and resistor 600 and the resulting negative trigger pulse is applied through diode 602 to the anode of the pentode 604 which is connected in a conventional screen-coupled phantastron circuit of the type described on page 197 of "Waveforms," supra. A time selector control for this phantastron circuit is provided by movement of contact 606 of precision linear potentiometer 608. A variable resistor 610 in series with this potentiometer provides for zero setting. A variable resistor 611 connected between the positive potential line and the grid of pentode 604 provides slope control.

The operation of this phantastron circuit is described in detail in the reference just given and need not be here repeated. It need only be mentioned that the accuracy of a circuit of this type in producing a time delay of a delivered trigger pulse is of the order of 0.1% and this linear with respect to the adjustment of the potentiometer contact 606 An accurately delayed positive pulse is secured by differentiation through the arrangement of condenser 612 and resistor 614. The delayed pulse thus secured is applied to a selector gate pulse generator which is a conventional Schmidt trigger circuit comprising triodes 616 and 618 with the anode of the former connected to the grid of the latter through the network comprising the condenser 622 and resistor 624, there being additionally provided a variable resistor 620 between the cathodes and ground to control the width of the positive output pulse delivered from the anode of triode 618 through line 626. A circuit of this type and its operation will be found in the Review of Scientific Instruments, of October 1946, volume 17, number 10, page 401. The result is the production of a positive gate pulse of selective width accurately delayed in time with respect to the trigger pulse produced at 562 through the controls 606 and 611.

The potential appearing at any desired point of the analog 594 undergoing analysis is picked up by a probe line 628 and applied to the high impedance input of a cathode follower arrangement including the triode 630 and the adjustable cathode resistance 632 which serves to provide a zero adjustment. The potential at the cathode of triode 630 follows closely the wave form applied at its grid and is applied through resistance 634 and diode 636 to a condenser 638 in a conventional peak diode circuit. Gating of this circuit is accomplished through the use of diode 640 and resistance 642 which latter is connected at its lower end to a source of negative potential, the anode of the diode 640 being connected to the anode of the diode 636. The line 626 carrying the positive gating pulses is connected through condenser 644 to the cathode of diode 640. Resistances 634 and 642 and the negative potential to which the latter is connected are such that the anode of diode 640 is at or below ground potential for the maximum positive potential applied to the probe line 628. Accordingly, in the absence of a delayed gate pulse, diode 640 is conducting for all values of the input probe potential and diode 636 is nonconducting. When the positive delayed gate pulse is applied to the cathode of diode 640, this diode ceases to conduct and condenser 638 charges up to the peak value of the potential of the cathode of triode 630 delivering the delayed gate pulse. The time constant provided by resistance 634 and condenser 638 is desirably quite small so that the condenser may charge fully during the duration of a narrow gate pulse, for example, of the order of 0.1 microsecond in width. The condenser 638 is connected to the input of a cathode follower circuit including the triode 648, a resistor 650, adjustable for zero adjustment, and the grid connecting resistor 646. The input impedance of this cathode follower arrangement may be quite high so that the discharge time constant of condenser 638 through it is correspondingly long. The cathode of triode 648 is connected through line 652 and diode 654 to the grid of triode 656 which is associated with a cathode resistor 660. A large condenser 658 connects the grid of triode 656 to ground. The cathode of triode 656 is connected through output meter 662 to the contact 664 of a potentiometer 666 connected between the positive voltage source and ground. This potentiometer arrangement provides balancing for the direct current level. The time constant provided by condenser 658 and the resistances between the cathode of triode 656 and ground may be quite long so that the condenser 658 will charge to the peak value of the wave form of the input at 628 during the repeated selector gate pulses produced in the line 626. The meter, of course, may be calibrated to compensate for errors introduced by the cathode follower circuits including the triodes 630, 648 and 656.

The peak amplitude of the selector gate pulse must be sufficient to overcome the negative potential applied to the cathode of diode 640 and the maximum allowable positive potential at the probe. Attenuators and associated switches may, of course, be provided to enlarge the voltage range of the apparatus.

As in the case of the more elaborate system previously described, it will be evident that the circuit of Figure 11 makes it possible to repeat a cycle of simulation of an analog system 594 and to measure the magnitude of the response at any phase instant of the repeated cycle. This may be done by the simplified arrangement of Figure 11 with a high precision of accuracy both as to time and amplitude, though the precision is inferior to that secured by the use of the arrangement previously described. It will, of course, be evident that between the two systems there may be provided many others of intermediate degrees of complexity, and it will also be evident that the circuit components are subject to a wide range of choice, particularly in such matters as the choice of oscillator instead of the multivibrator which has been described, in the choice of other time selector circuits than the phantastron circuit which has been described, and in the matter of the gate pulse generator as well as in the other components. The gated vacuum tube voltmeter circuit may, of course, take many forms.

While, as indicated, the analog system at 594 may take many forms, some of which may be quite elaborate, there are various simple uses of the analyzer of Figure 11 which are particularly important and significant. One of the simplest but most useful applications is for the measurement of capacitance. If a square wave output is fed to the capacitor undergoing measurement through a known resistance, the output voltage across the capacitor as a function of time can be measured on the output meter using the time selector. The time required for the capacitor potential to reach 63.2% of the square wave amplitude is the RC time constant from which the capacitance may be obtained by dividing the time by the known value of series resistance. By involving a number of precision resistors a wide variety of capacitance ranges may be measured with direct reading on the time selector dial. The measurement of inductance may be accomplished in a similar manner based upon the time constant of an RL circuit.

It will be evident that the analyzer may be directly used for the determination of frequency and phase shifts of recurrent wave forms from the generators of which synchronizing pulses may be introduced through the external connection 564. In particular, in the case of pulsed oscillators, an external trigger at the repetition rate of the pulsed oscillator may be fed into the analyzer and the frequency of the oscillations may be determined by measuring the time between successive cycles. Generally of particular interest in such cases are the periods of the first few cycles which may deviate considerably from the period of succeeding cycles. Phase shifts occurring in various parts of a circuit may be measured by a similar procedure.

It may be noted that the analog such as 594 need not be electrical except as to its input and output, but may be practically any physical system in which a transient phenomenon may be caused to occur repeatedly. For example, it may well be an acoustic or other vibrational system having as its input an acoustic pulse or wave form generator, for example, a crystal transducer, and having as its output a microphone or similar transducer capable of producing an electrical signal. Such an arrangement, for example, may be used to plot the acoustic reflection characteristics of a chamber constituting a full or small scale analog.

Another example of the use of a system is involved in the measurement of pressures in an internal combustion engine during its operation. In such case the repeated period may be initiated by a contact member on the engine shaft and pressures may be laid into an electrical output by means of a suitable pressure transducer such as a crystal. By the use of the system, the pressure may then be sampled at any instant of the transient charge consisting of the cyclical variations of pressure in the cylinder.

In summary, both of the particular analyzers which have been described are adapted very generally for the measurement of transient phenomena which may be induced to occur periodically, and these measurements may be made to a degree of precision not obtainable by the use of oscilloscopes. It will, accordingly, be apparent that the invention is not to be regarded as limited except as required by the following claims.

What is claimed is:

1. In combination, an electrical configuration involving distributed resistance and capacitance provided over an extended area, means for producing repeatedly in each of a plurality of successive periods of time a transient current flow in said configuration, means for producing at substantially the same phase in each of said periods a signal having a duration very short in comparison with the duration of one of said periods, and means controlled by said signals accumulating a response to electrical conditions of said configuration at the time of occurrence of said signals.

2. In combination, an electrical configuration involving distributed resistance and capacitance provided over an extended area, means for producing repeatedly in each of a plurality of successive periods of time a transient current flow in said configuration, said means including devices for controlling said transient current flow at a plurality of points of said configuration, means for producing at substantially the same phase in each of said periods a signal having a duration very short in comparison with the duration of one of said periods, and means controlled by said signals responsive to an electrical condition of said configuration at the time of occurrence of each of said signals.

3. In combination, an electrical configuration involving distributed resistance and capacitance provided over an extended area, means for producing repeatedly in each of a plurality of successive periods of time a transient current flow in said configuration, means for producing at substantially the same phase in each of said periods a signal having a duration very short in comparison with the duration of one of said periods, and means controlled by said signals responsive to an electrical condition of said configuration at the time of occurrence of each of said signals, the last mentioned means including a probe of high input impedance movable over said area to make selective electrical contact with points of said area.

4. In combination, an electrical configuration involving distributed resistance and capacitance provided over an extended area, means for producing repeatedly in each of a plurality of successive periods of time a transient current flow in said configuration, said means including devices for controlling said transient current flow at a plurality of points of said configuration, means for producing at substantially the same phase in each of said periods a signal having a duration very short in comparison with the duration of one of said periods, and means controlled by said signals responsive to an electrical condition of said configuration at the time of occurrence of each of said signals, the last mentioned means including a probe of high input impedance movable over said area to make selective electrical contact with points of said area.

5. In combination, an electrical configuration involving distributed resistance and capacitance provided over an extended area, means for producing repeatedly in each of a plurality of successive periods of time a transient current flow in said configuration, said means including devices for controlling said transient current flow at a plurality of points of said configuration, means for producing at substantially the same phase in each of said periods a signal having a duration very short in comparison with the duration of one of said periods, means for adjusting the last mentioned means to shift the phase of said signal, and means controlled by said signals responsive to an electrical condition of said configuration at the time of occurrence of each of said signals, the last mentioned means including a probe of high input impedance movable over said area to make selective electrical contact with points of said area.

6. In combination, an electrical configuration involving distributed resistance and capacitance provided over an extended area, means for producing repeatedly in each of a plurality of successive periods of time a transient current flow in said configuration, means for producing at substantially the same phase in each of said periods a signal having a duration very short in comparison with the duration of one of said periods, means for adjusting the last mentioned means to shift the phase of said signal, and means controlled by said signals responsive to an electrical condition of said configuration at the time of occurrence of each of said signals, the last mentioned means including a probe of high input impedance movable over said area to make selective electrical contact with points of said area.

7. In combination, an electrical configuration, means for producing repeatedly in each of a plurality of successive periods of time transient current flow in said configuration, said means including a pair of independent devices, each programmed repeatedly in said periods of time, for simultaneously controlling said transient current flow, means for producing at substantially the same phase in each of said periods a signal having a duration very short in comparison with the duration of said periods, and means controlled by said signals responsive to an electrical condition of said configuration at the time of occurrence of each of said signals.

8. In combination, an electrical configuration involving distributed resistance and capacitance provided over an extended area, means for producing repeatedly in each of a plurality of successive periods of time a transient current flow in said configuration to give rise to varying electrical conditions therein, means for producing at substantially the same phase in each of said periods a signal having a duration very short in comparison with the duration of one of said periods, means for adjusting the last mentioned means to shift the phase of said signal, and means controlled by said signals and connected to said electrical configuration so as to be responsive to an electrical condition of said configuration at the time of occurrence of each of said signals and providing an output serving as a measure of the last mentioned condition.

9. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a lead from a point of the first conductor, means for producing repeatedly in each of a plurality of successive periods of time transient current flows through said third conductor and said lead to give rise to varying electrical conditions in said configuration, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition.

10. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a plurality of leads from spaced points of the first conductor, means for producing repeatedly in each of a plurality of successive periods of time transient current flows through said third conductor and each of said leads to give rise to varying electrical conditions in said configuration, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition.

11. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a lead from a point of the first conductor, means for producing repeatedly in each of a plurality of successive periods of time transient current flows through said third conductor and said lead to give rise to varying electrical conditions in said configuration, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition, the last mentioned means including a probe of high input impedance movable over said first conductor to make selective electrical contact with points thereof.

12. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a plurality of leads from spaced points of the first conductor, means for producing repeatedly in each of a plurality of successive periods of time transient current flows through said third conductor and each of said leads to give rise to varying electrical conditions in said configuration, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition, the last mentioned means including a probe of high input impedance movable over said first conductor to make selective electrical contact with points thereof.

13. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a lead from a point of the first conductor, means for producing repeatedly in each of a plurality of successive periods of time transient current flows through said third conductor and said lead to give rise to varying electrical conditions in said configuration, said means including a resistance-capacitance network of lumped parameters and charging means therefor, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition.

14. In combination, an electrical configuration comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, and a plurality of leads from spaced points of the first conductor, means for producing repeatedly in each of a plurality of successive periods of time transient current flows through said third conductor and each of said leads to give rise to varying electrical conditions in said configuration, said means including a resistance-capacitance network of lumped parameters and charging means therefor, means for producing at substantially the same phase in each of said periods a signal having a duration very short in comparison with the duration of one of said periods, and means controlled by said signals and connected to said electrical configuration so as to be responsive to an electrical condition of said configuration at the time of occurrence of each of said signals and providing an output serving as a measure of the last mentioned condition.

15. An electrical analog of an oil reservoir comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, a lead from a point of the first conductor, means for supporting said lead for movement over the area of said first conductor, and means for applying to said conductors a cyclic electrical input.

16. An electrical analog of an oil reservoir comprising a conductor extending over an area and having substantial distributed resistance, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, a lead from a point of the first conductor, a resistance-capacitance network of lumped parameters connected to said third conductor, and means for applying to said network a cyclic electrical input.

17. An electrical analog of an oil reservoir comprising a conductor extending over an area and having substantial distributed resistance variable over said area, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, a lead from a point of the first conductor, means for supporting said lead for movement over the area of said first conductor, and means for applying to said conductors a cyclic electrical input.

18. An electrical analog of an oil reservoir comprising a conductor extending over an area and having substantial distributed resistance variable over said area, a second conductor having an area adjacent to an area of the first conductor and thereby providing with the first conductor a distributed capacitance, a third conductor of relatively high conductance engaging the first conductor through an extended region thereof to provide a substantially equipotential boundary for the first conductor, a lead from a point of the first conductor, a resistance-capacitance network of lumped parameters connected to said third conductor, and means for applying to said network a cyclic electrical input.

19. In combination, means for producing repeatedly in each of a plurality of successive periods of time a transient current flow in an electrical configuration to give rise to varying electrical conditions therein, means interconnected with the first mentioned means for producing at substantially the same phase in each of said periods a signal having a duration very short in comparison with the duration of one of said periods, and means gated by said signals and connected to said electrical configuration so as to be responsive to an electrical condition of said configuration only at the time of occurrence of each of said signals and providing an output serving as a measure of the last mentioned condition at said occurrence time.

20. In combination, means for producing repeatedly in each of a plurality of successive periods of time a transient condition in a physical system, means interconnected with the first mentioned means for producing at substantially the same phase in each of said periods a signal having a duration very short in comparison with the duration of one of said periods, and means gated by said signals and connected to said physical system so as to be responsive to a value of said transient condition only at the time of occurrence of each of said signals and providing an output serving as a measure of said value at said occurrence time.

21. In combination, means for producing repeatedly in each of a plurality of successive periods of time a transient current flow in an electrical configuration to give rise to varying electrical conditions therein, means interconnected with the first mentioned means for producing at substantially the same phase in each of said periods a signal having a duration very short in comparison with the duration of one of said periods, means for adjusting the last mentioned means to shift the phase of said signal, and means gated by said signals and connected to said electrical configuration so as to be responsive to an electrical condition of said configuration only at the time of occurrence of each of said signals and providing an output serving as a measure of the last mentioned condition at said occurrence time.

22. In combination, means for producing repeatedly in each of a plurality of successive periods of time a transient condition in a physical system, means interconnected with the first mentioned means for producing at substantially the same phase in each of said periods a signal having a duration very short in comparison with the duration of one of said periods, means for adjusting the last mentioned means to shift the phase of said signal, and means gated by said signals and connected to said physical system so as to be responsive to a value of said transient condition only at the time of occurrence of each of said signals and providing an output serving as a measure of said value at said occurrence time.

23. In combination, means for producing repeatedly in each of a plurality of successive periods of time a transient current flow in an electrical configuration to give rise to varying electrical conditions therein, means interconnected with the first mentioned means for producing at substantially the same phase in each of said periods a signal having a duration very short in comparison with the duration of one of said periods, and means gated by said signals, connected to said electrical configuration, accumulating over a period greater than one of said successive periods a response to electrical conditions of said configuration only at the times of occurrence of said signals and providing an output serving as a measure of said accumulated response.

24. In combination, means for producing repeatedly in each of a plurality of successive periods of time a transient condition in a physical system, means interconnected with the first mentioned means for producing at substantially the same phase in each of said periods a signal having a duration very short in comparison with the duration of one of said periods, and means gated by said signals, connected to said physical system, accumulating over a period greater than one of said successive periods a response to values of said transient only at the times of occurrence of said signals and providing an output serving as a measure of said accumulated response.

25. In combination, means for producing repeatedly in each of a plurality of successive periods of time a transient current flow in an electrical configuration to give rise to varying electrical conditions therein, said means including devices for controlling said transient current flow at a plurality of points of said configuration, means interconnected with the first mentioned means for producing at substantially the same phase in each of said periods a signal having a duration very short in comparison with the duration of one of said periods, and means gated by said signals and connected to said electrical configuration so as to be responsive to an electrical condition of said configuration only at the time of occurrence of each of said signals and providing an output serving as a measure of the last mentioned conditions at said occurrence time.

26. In combination, means for producing repeatedly in each of a plurality of successive periods of time a transient condition in a physical system, said means including devices for controlling said transient condition at a plurality of points of said system, means interconnected with the first mentioned means for producing at substantially the same phase in each of said periods a signal having a duration very short in comparison with the duration of one of said periods, and means gated by said signals and connected to said physical system so as to be responsive to a value of said transient condition only at the time of occurrence of each of said signals and providing an output serving as a measure of said value at said occurrence time.

27. In combination, an electrical configuration involving distributed resistance and capacitance provided over an extended area, means for producing repeatedly in each of a plurality of successive periods of time a transient current flow in said configuration to give rise to varying electrical conditions therein, means interconnected with the first mentioned means for producing at substantially the same phase in each of said periods a signal having a duration very short in comparison with the duration of one of said periods, and means gated by said signals and connected to said electrical configuration so as to be responsive to an electrical condition of said configuration only at the time of occurrence of each of said signals and providing an output serving as a measure of the last mentioned condition at said occurrence time.

28. In combination, means for producing repeatedly in each of a plurality of successive periods of time a transient current flow in an electrical configuration to give rise to varying electrical conditions therein, means interconnected with the first mentioned means for producing at substantially the same phase in each of said periods a signal having a duration very short in comparison with the duration of one of said periods, and means gated by said signals and connected to said electrical configuration so as to be responsive to an electrical condition of said configuration only at the time of occurrence of each of said signals and providing an output corresponding to the average of the values of said electrical condition existing at the times of occurrence of a succession of said signals.

29. In combination, means for producing repeatedly in each of a plurality of successive periods of time a transient condition in a physical system, means interconnected with the first mentioned means for producing at substantially the same phase in each of said periods a signal having a duration very short in comparison with the duration of one of said periods, and means gated by said signals and connected to said physical system so as to be responsive to a value of said transient condition only at the time of occurrence of each of said signals and providing an output corresponding to the average of the values of said transient condition existing at the times of occurrence of a succession of said signals.

30. In combination, an electrical configuration, means for producing repeatedly in each of a plurality of successive periods of time transient current flow in said configuration, said means including a device programmed repeatedly in said periods of time for simultaneously controlling said transient current flow, means interconnected with the first mentioned means for producing at substantially the same phase in each of said periods a signal having a duration very short in comparison with the duration of said periods, and means gated by said signals responsive to an electrical condition of said configuration only at the time of occurrence of each of said signals.

References Cited in the file of this patent

UNITED STATES PATENTS

| | | | |
|---|---|---|---|
| 2,338,636 | Goodrum et al. | Jan. 4, | 1944 |
| 2,419,541 | De Rosa | Apr. 29, | 1947 |
| 2,420,891 | McCann | May 20, | 1947 |
| 2,423,754 | Bruce | July 8, | 1947 |
| 2,426,216 | Hight | Aug. 26, | 1947 |
| 2,458,829 | Bruce | Jan. 11, | 1949 |
| 2,470,434 | Eckman | May 17, | 1949 |
| 2,472,464 | Bruce | June 7, | 1949 |
| 2,542,478 | Clark | Feb. 20, | 1951 |
| 2,547,950 | Lee et al. | Apr. 10, | 1951 |
| 2,569,510 | Wolf | Oct. 2, | 1951 |
| 2,569,816 | Lee | Oct. 2, | 1951 |
| 2,569,817 | Wolf et al. | Oct. 2, | 1951 |